US012548910B2

(12) United States Patent
Leung et al.

(10) Patent No.: US 12,548,910 B2
(45) Date of Patent: Feb. 10, 2026

(54) ANTENNA AND METHOD OF MAKING ANTENNA PART

(71) Applicant: City University of Hong Kong, Kowloon (HK)

(72) Inventors: Kwok Wa Leung, Kowloon (HK); Chen Yang, Kowloon (HK)

(73) Assignee: City University of Hong Kong, Kowloon (HK)

( * ) Notice: Subject to any disclaimer, the term of this patent is extended or adjusted under 35 U.S.C. 154(b) by 363 days.

(21) Appl. No.: 18/193,141

(22) Filed: Mar. 30, 2023

(65) Prior Publication Data

US 2024/0332806 A1 Oct. 3, 2024

(51) Int. Cl.

| | |
|---|---|
| ***H01Q 1/52*** | (2006.01) |
| ***H01Q 9/04*** | (2006.01) |
| ***H01Q 15/24*** | (2006.01) |

(52) U.S. Cl.

CPC ........... *H01Q 9/0485* (2013.01); *H01Q 15/24* (2013.01)

(58) Field of Classification Search

CPC ...... H01Q 9/0485; H01Q 15/24; H01Q 1/523; H01Q 1/24; H01Q 1/521; H01Q 21/28

See application file for complete search history.

(56) References Cited

U.S. PATENT DOCUMENTS

| | | | | |
|---|---|---|---|---|
| 5,661,494 | A * | 8/1997 | Bondyopadhyay .... | H01Q 1/364 343/700 MS |
| 10,950,933 | B2 * | 3/2021 | Xu .......................... | H01Q 21/28 |
| 12,206,174 | B2 * | 1/2025 | Pance .................. | H01Q 9/0485 |
| 2014/0313089 | A1 * | 10/2014 | Wu ........................ | H01Q 21/28 343/893 |
| 2020/0235490 | A1 * | 7/2020 | Carceller ............. | H01Q 9/0414 |
| 2023/0387587 | A1 * | 11/2023 | Leung ...................... | H01Q 1/48 |

FOREIGN PATENT DOCUMENTS

| | | |
|---|---|---|
| CN | 110112577 A | 8/2020 |
| CN | 215184529 U | 12/2021 |
| KR | 20190090952 A | 8/2019 |

OTHER PUBLICATIONS

A. J. Paulraj, D. A. Gore, R. U. Nabar, and H. Bolcskei, "An Overview of MIMO Communications—A Key to Gigabit Wireless," Proc. IEEE, vol. 92, No. 2, pp. 198-218, Feb. 2004.

S. Deshpande, "Appendix B: Introduction to MIMO and Massive MIMO," in Fundamentals of Network Planning and Optimisation 2G/3G/4G, Chichester, UK: John Wiley & Sons, Ltd, 2018, pp. 325-335.

K. Chen, S. Zhang, and Q. Li, "A Review of Mutual Coupling in MIMO Systems," IEEE Access, vol. 6, pp. 24706-24719, 2018.

J. X. Yun and R. G. Vaughan, "Multiple Element Antenna Efficiency and its Impact on Diversity and Capacity," IEEE Trans. Antennas Propag., vol. 60, No. 2, pp. 529-539, Feb. 2012.

(Continued)

*Primary Examiner* — Awat M Salih

(74) *Attorney, Agent, or Firm* — Renner, Kenner, Greive, Bobak, Taylor & Weber

(57) ABSTRACT

An antenna includes a plurality of antenna elements each respectively operable as a radiator of electromagnetic waves and a decoupler arrangement configured to prevent or reduce mutual coupling of the plurality of antenna elements when one or more of the plurality of antenna elements are operated as radiator.

24 Claims, 20 Drawing Sheets

(56) References Cited

OTHER PUBLICATIONS

R. Tian, B. K. Lau, and Z. Ying, "Multiplexing Efficiency of MIMO Antennas," IEEE Antennas Wirel. Propag. Lett., vol. 10, pp. 183-186, 2011.
A. Kumar, A. Q. Ansari, B. K. Kanaujia, J. Kishor, and L. Matekovits, "A Review on Different Techniques of Mutual Coupling Reduction Between Elements of Any MIMO Antenna. Part 2: Metamaterials and Many More," Radio Sci., vol. 56, No. 3, Mar. 2021.
Shichang Gao, Qi Luo, Fuguo Zhu, Ed., Circularly Polarized Antennas. Wiley / IEEE Press, 2014.
I. Adam et al., "Mutual Coupling Reduction of a Wideband Circularly Polarized Microstrip MIMO Antenna," IEEE Access, vol. 7, pp. 97838-97845, 2019.
M. Akbari, H. Abo Ghalyon, M. Farahani, A.-R. Sebak, and T. A. Denidni, "Spatially Decoupling of CP Antennas Based on FSS for 30-GHz MIMO Systems," IEEE Access, vol. 5, pp. 6527-6537, 2017.
Z. Yang and K. F. Warnick, "Analysis and Design of Intrinsically Dual Circular Polarized Microstrip Antennas Using an Equivalent Circuit Model and Jones Matrix Formulation," IEEE Trans. Antennas Propag., vol. 64, No. 9, pp. 3858-3868, Sep. 2016.
M. Y. Jamal, M. Li, and K. L. Yeung, "Isolation Enhancement of Closely Packed Dual Circularly Polarized MIMO Antenna Using Hybrid Technique," IEEE Access, vol. 8, pp. 11241-11247, 2020.
S. R. Thummaluru and R. K. Chaudhary, "Mu-negative metamaterial filter-based isolation technique for MIMO antennas," Electron. Lett., vol. 53, No. 10, pp. 644-646, May 2017.
H. Tran-Huy, N. Hussain, H. C. Park, and N. Nguyen-Trong, "Isolation in Dual-Sense CP MIMO Antennas and Role of Decoupling Structures," IEEE Antennas Wirel. Propag. Lett., pp. 1203-1207, 2022.
K. M. Luk, Ed., Dielectric resonator antennas. Baldock: Research Studies Press, 2003.
A. Petosa, Dielectric resonator antenna handbook. Boston: Artech House, 2007.
G. Das, A. Sharma, and R. K. Gangwar, "Dielectric resonator based circularly polarized MIMO antenna with polarization diversity," Microw. Opt. Technol. Lett., vol. 60, No. 3, pp. 685-693, Mar. 2018.
N. K. Sahu, G. Das, R. K. Gangwar, and K. Rambabu, "An Arrangement for Four-Element MIMO DRA With Complementary CP Diversity," IEEE Antennas Wirel. Propag. Lett., vol. 20, No. 9, pp. 1616-1620, Sep. 2021.
Y. Hu, Y. M. Pan, and M. Di Yang, "Circularly Polarized MIMO Dielectric Resonator Antenna With Reduced Mutual Coupling," IEEE Trans. Antennas Propag., vol. 69, No. 7, pp. 3811-3820, Jul. 2021.
N. K. Sahu, G. Das, and R. K. Gangwar, "Dielectric resonator-based wide band circularly polarized MIMO antenna with pattern diversity for WLAN applications," Microw. Opt. Technol. Lett., vol. 60, No. 12, pp. 2855-2862, Dec. 2018.
H. N. Chen, J.-M. Song, and J.-D. Park, "A Compact Circularly Polarized MIMO Dielectric Resonator Antenna Over Electromagnetic Band-Gap Surface for 5G Applications," IEEE Access, vol. 7, pp. 140889-140898, 2019.
J. Iqbal, U. Illahi, M. I. Sulaiman, M. M. Alam, M. M. Suud, and M. N. Mohd Yasin, "Mutual Coupling Reduction Using Hybrid Technique in Wideband Circularly Polarized MIMO Antenna for WiMAX Applications," IEEE Access, vol. 7, pp. 40951-40958, 2019.
C. Yang, K. Lu, and K. W. Leung, "Dielectric Decoupler for Compact MIMO Antenna Systems," IEEE Trans. Antennas Propag., vol. 70, No. 8, pp. 6444-6454, Aug. 2022.

* cited by examiner

ANTENNA AND METHOD OF MAKING ANTENNA PART

TECHNICAL FIELD

The invention generally relates to an antenna, and a method of making at least part of an antenna.

BACKGROUND

Multi-input-multi-output (MIMO) technology can be used to enhance robustness and/or data rate of a wireless communication system. In a MIMO system, mutual coupling between antenna elements may be undesirable as it may reduce the communication reliability when the MIMO system is operated in diversity mode and/or lower the channel capacity when the MIMO system is operated in multiplexing mode.

SUMMARY OF THE INVENTION

In a first aspect of the invention, there is provided an antenna comprising a plurality of antenna elements each respectively operable as a radiator of electromagnetic waves and a decoupler arrangement configured (e.g., sized and/or shaped and/or oriented and/or located) to prevent or reduce mutual coupling of the plurality of antenna elements when one or more (e.g., all) of the plurality of antenna elements are operated as radiator. In some embodiments, the plurality of antenna elements are simultaneously operable as radiators. In some embodiments, the plurality of antenna elements are selectively operable as radiator (i.e., the plurality of antenna elements need not all operate as radiators at the same time). In some embodiments, the plurality of antenna elements are independently operable.

Optionally, the plurality of antenna elements have substantially the same shape and/or size and/or are made of the same material(s). Optionally, the plurality of antenna elements have substantially the same construction (in terms of shape, size, and material(s)).

Optionally, the plurality of antenna elements are each respectively configured to operate as a radiator of generally circularly-polarized electromagnetic waves.

Optionally, the plurality of antenna elements are each respectively configured to operate as a radiator of generally circularly-polarized electromagnetic waves of the same sense. In some examples, the plurality of antenna elements are each respectively configured to operate as a radiator of generally left-hand circularly-polarized electromagnetic waves. In some examples, the plurality of antenna elements are each respectively configured to operate as a radiator of generally right-hand circularly-polarized electromagnetic waves.

The plurality of antenna elements may include patches, dipoles, slots, dielectric resonators, etc. The plurality of antenna elements comprise two or more antenna elements. In some examples, the plurality of antenna elements consist only of two antenna elements.

Optionally, the plurality of antenna elements comprise, at least, a first dielectric resonator element and a second dielectric resonator element. In some examples, the plurality of antenna elements consist only of a first dielectric resonator element and a second dielectric resonator element.

The first dielectric resonator element and/or the second dielectric resonator element may each be shaped respectively as: a cuboid, a cube, a right or oblique prism (polygonal, e.g., rectangular, rhombic, trapezoidal, pentagonal, hexagonal, etc.), a right or oblique cylinder (e.g., circular, elliptic, oblong, obround, oval, etc.), etc.

In some examples, the first dielectric resonator element and the second dielectric resonator element each comprises a generally cuboidal or generally cubic body. Optionally, the generally cuboidal or generally cubic body comprises a cuboidal or cubic portion and a corresponding chamfered cuboidal or cubic portion. In some examples, the corresponding chamfered cuboidal or cubic portion may be considered as a generally hexagonal prism portion.

Optionally, the corresponding chamfered cuboidal or cubic portion comprises opposed chamfered edges each having a respective chamfer angle of about 30 degrees to about 60 degrees, about 40 degrees to about 50 degrees, or about 45 degrees.

Optionally, in plan view, a center of the first dielectric resonator element and a center of the second dielectric resonator element are separated by less than $0.5\lambda_0$, less than $0.4\lambda_0$, or about $0.3\lambda_0$ (e.g., $0.33\lambda_0$), where $\lambda_0$ is wavelength in air at a center frequency of operation frequency band of the antenna.

Optionally, the plurality of antenna elements are additively manufactured.

Optionally, the plurality of antenna elements are each made of one or more dielectric materials.

Optionally, the decoupler arrangement comprises a dielectric decoupler receiving or covering at least part of each of the plurality of antenna elements.

Optionally, the dielectric decoupler comprises a dielectric member (e.g., dielectric block) receiving or covering at least part of each of the plurality of antenna elements. In some examples, the dielectric decoupler consists only of the dielectric member. Optionally, the dielectric member is made of one or more dielectric material(s), each of which may be in solid (bulk, powder, etc.) or liquid form.

The dielectric member may include one or more layers or portions, each made of one or more dielectric material(s), each of which may be in solid (bulk, powder, etc.) or liquid form. In some examples, the dielectric member has multiple layers and the dielectric constant or effective dielectric constant of the layers generally decreases away from the antenna elements.

Optionally, the dielectric member comprises a body and one or more holes formed in the body. The one or more holes receive at least part of each of the plurality of antenna elements. The body of the dielectric member may be shaped as: a cuboid, a cube, a right or oblique prism (polygonal, e.g., rectangular, rhombic, trapezoidal, pentagonal, hexagonal, etc.), a right or oblique cylinder (e.g., circular, elliptic, oblong, obround, oval, etc.), etc. In some examples, the dielectric member is a generally cuboidal or generally cubic. The one or more holes may each be a blind-hole. The shape of the one or more holes may correspond to the shape of the antenna elements (e.g., the same shape, with the same size or different sizes). In some examples, a plurality of holes are formed in the body, and each of the plurality of holes is for a respective one of the plurality of antenna elements.

Optionally, the dielectric member is additively manufactured.

Optionally, the plurality of antenna elements each has a first dielectric constant or effective dielectric constant, and the dielectric member has a second dielectric constant or effective dielectric constant less than the first dielectric constant or effective dielectric constant. In some examples, the second dielectric constant or effective dielectric constant may be equal to or less than half of the first dielectric constant or effective dielectric constant.

Optionally, the antenna further comprises a polarizer arrangement operably coupled with the plurality of antenna elements and configured to affect polarization of electromagnetic waves provided by one or more of the plurality of antenna elements when one or more of the plurality of antenna elements are operated as radiator.

Optionally, the polarizer arrangement is connected with the decoupler arrangement.

Optionally, the polarizer arrangement is at least partly integrated with the decoupler arrangement (e.g., such that the polarizer arrangement may be operable as part of the decoupler arrangement).

Optionally, the polarizer arrangement and the decoupler arrangement are integrally formed. The polarizer arrangement may be arranged on the decoupler arrangement.

Optionally, the plurality of antenna elements are each respectively configured to operate as a radiator of generally circularly-polarized electromagnetic waves, and accordingly, the polarizer arrangement is a circular polarization polarizer arrangement configured to facilitate or enhance circular polarization of electromagnetic waves provided by one or more of the plurality of antenna elements.

Optionally, the polarizer arrangement comprises a plurality of dielectric polarizer members that are spaced apart. The plurality of dielectric polarizer members may each be shaped as: a cuboid, a cube, a right or oblique prism (polygonal, e.g., rectangular, rhombic, trapezoidal, pentagonal, hexagonal, etc.), a right or oblique cylinder (e.g., circular, elliptic, oblong, obround, oval, etc.), etc.

Optionally, the polarizer arrangement comprises a plurality of dielectric slabs that are spaced apart and are arranged generally in parallel with a polarizer arrangement axis. The plurality of dielectric slabs may each be shaped as a cuboid or a cube. In some examples, the plurality of dielectric slabs have generally the same height. In some examples, the height(s) of the plurality of dielectric slabs is/are smaller than a height of the dielectric member.

In some examples in which the decoupler arrangement comprises a dielectric member receiving or covering at least part of each of the plurality of antenna elements, the dielectric member extends along a generally horizontal axis, and the polarizer arrangement axis and the generally horizontal axis are arranged at an angle of about 30 degrees to about 60 degrees, about 40 degrees to about 50 degrees, or about 45 degrees.

Optionally, the plurality of antenna elements each has a first dielectric constant or effective dielectric constant. Optionally, the decoupler arrangement or the dielectric member has a second dielectric constant or effective dielectric constant less than the first dielectric constant or effective dielectric constant. Optionally, the polarizer arrangement has a third dielectric constant or effective dielectric constant less than the second dielectric constant or effective dielectric constant.

Optionally, the plurality of antenna elements each has a first dielectric constant or effective dielectric constant. Optionally, the plurality of dielectric slabs each has a second dielectric constant or effective dielectric constant less than the first dielectric constant or effective dielectric constant. Optionally, the plurality of dielectric slabs each has generally the same dielectric constant or effective dielectric constant as the decoupler arrangement or the dielectric member.

Optionally, the antenna further comprises a substrate with a first side and a second side opposite the first side, and a ground plane arranged on the first side of the substrate. The ground plane is metallic and may be made of aluminium, copper, etc. The plurality of antenna elements and the decoupler arrangement may be arranged on or above the ground plane. The polarizer arrangement may further be arranged on or above the ground plane. In some examples, the plurality of antenna elements and the decoupler arrangement (e.g., the dielectric member) are mounted directly on the ground plane. The substrate may be a PCB substrate, with one or more substrate layers.

Optionally, the antenna further comprises a feed arrangement. The feed arrangement may include a plurality of feeds each configured for a respective one of the plurality of antenna elements. In some examples, each of the plurality of feeds comprises a slot feed mechanism.

Optionally, each of the plurality of feeds respectively comprises: a slot arranged on the ground plane and on which a respective one of the plurality of antenna elements is placed, a feedline circuit arranged on the second side of the substrate and operably coupled with the slot, and a port operably coupled with the feedline circuit. In some examples, the slot overlaps with part of the feedline circuit in plan view. In some examples in which each of the plurality of feeds includes a respective port, the antenna is thus a multi-port antenna.

Optionally, the slot comprises a generally cross-shaped slot. In some examples, the generally cross-shaped slot comprises a longer generally rectangular slot portion and a shorter generally rectangular slot portion that are arranged generally perpendicularly. In some examples, the longer generally rectangular slot portion elongates along a long axis that is generally perpendicular to the polarizer arrangement axis.

Optionally, the port comprises an RF connector. The RF connector may be, e.g., SMA connector, SMP connector, N connector, SMB connector, etc.

Optionally, the antenna is configured to operate at X-band (e.g., in at least some frequencies in about 8.0 GHz to about 12.0 GHz). In some examples, the antenna is operable only at X-band. In some examples, the antenna is also operable in other frequency, frequencies, or frequency band(s).

In some examples, the antenna in the first aspect can be operated as a transmit antenna. In some examples, the antenna in the first aspect can be operated as a receive antenna. In some examples, the antenna in the first aspect can be operated as a transceiver antenna (e.g., simultaneous transmit and receive using different antenna elements).

In a second aspect, there is provided a system/device comprising one or more of the antenna of the first aspect. In some examples, the system/device may be a communication system/device that can perform, at least, wireless communication. In some examples, the system/device may be an IoT system/device, a satellite communication system/device, etc. In some examples, the system/device may be a multiple-in multiple-out (MIMO) antenna system/device. The system/device may be a portable system/device. The system/device may be a handheld system/device.

In a third aspect, there is provided a method of making a part for an antenna. The method includes additively manufacturing a plurality of antenna elements each respectively operable as a radiator of electromagnetic waves, and additively manufacturing a decoupler arrangement such that the decoupler arrangement is configured to prevent or reduce mutual coupling of the plurality of antenna elements when one or more of the plurality of antenna elements are operated as radiator. The part for the antenna comprises the plurality of antenna elements and the decoupler arrangement.

Optionally, the additive manufacturing of the plurality of antenna elements and the additive manufacturing of the decoupler arrangement are performed at least partly substantially simultaneously.

Optionally, the plurality of antenna elements are additive manufactured using a dielectric material with a first dielectric constant, and the decoupler arrangement is additive manufactured using a dielectric material with a second dielectric constant smaller than the first dielectric constant.

Optionally, the method further comprises additively manufacturing a polarizer arrangement such that the polarizer arrangement is operably coupled with the plurality of antenna elements and configured to affect polarization of electromagnetic waves provided by one or more of the plurality of antenna elements when one or more of the plurality of antenna elements are operated as radiator. The part for the antenna may further comprise the polarizer arrangement.

Optionally, the additive manufacturing of the decoupler arrangement and the additive manufacturing of the polarizer arrangement are arranged such that the decoupler arrangement and the polarizer arrangement are integrally formed.

Optionally, the polarizer arrangement and the decoupler arrangement are additively manufactured using the same dielectric material(s).

Optionally, the antenna is the antenna of the first aspect. As such, one or more relevant optional features of the first aspect may be applicable to the method of the third aspect.

In a fourth aspect, there is provided a part of an antenna made using the method of the third aspect.

In a fifth aspect, there is provided an antenna comprising the part of the fourth aspect.

In a sixth aspect, there is provided a method of making an antenna comprising: arranging the part of the fourth aspect on a ground plane of an assembly to form an antenna, the assembly includes a substrate with a first side and a second side opposite the first side, a ground plane arranged on the first side of the substrate, and a plurality of feeds.

In a seventh aspect, there is provided an antenna made using the method of the sixth aspect.

Other features and aspects of the invention will become apparent by consideration of the detailed description and accompanying drawings. Any feature(s) described herein in relation to one aspect or embodiment may be combined with any other feature(s) described herein in relation to any other aspect or embodiment as appropriate and applicable.

Terms of degree such that "generally", "about", "substantially", or the like, are used, depending on context, to account for manufacture tolerance, degradation, trend, tendency, imperfect practical condition(s), etc. For example, when a value is modified by terms of degree, such as "about", such expression may include the stated value ±15%, ±10%, ±5%, ±2%, or ±1%.

Unless otherwise specified, the terms "connected", "coupled", "mounted" or the like, are intended to encompass both direct and indirect connection, coupling, mounting, etc.

BRIEF DESCRIPTION OF THE DRAWINGS

Embodiments of the invention will now be described, by way of example, with reference to the accompanying drawings in which.

DETAILED DESCRIPTION

Figure 21:
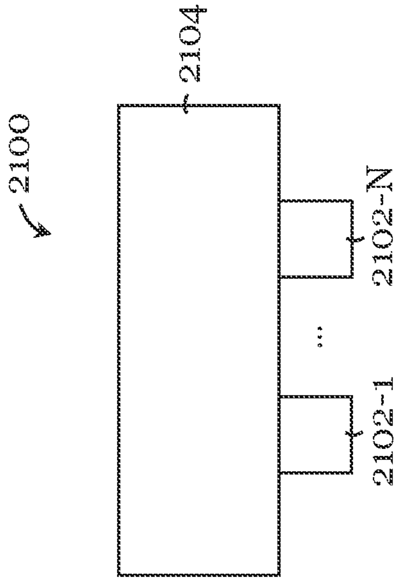
FIG. 21 is a schematic diagram illustrating an antenna in embodiments of the invention.

FIG. 21 shows an antenna 2100 in embodiments of the invention. The antenna 2100 includes multiple antenna elements 2102-1 to 2102-N (N can be an integer ≥2) and a decoupler arrangement 2104.

The antenna elements 2102-1 to 2102-N are each operable as radiator of electromagnetic waves, such as radiator of generally circularly-polarized electromagnetic waves. In some embodiments, the antenna elements 2102-1 to 2102-N may simultaneously operate as radiators. In some embodiments, the antenna elements 2102-1 to 2102-N may selectively operate as radiator. In some embodiments, the antenna elements 2102-1 to 2102-N may independently operate. The antenna elements 2102-1 to 2102-N may have substantially the same shape and/or size and/or are made of the same material(s). For example, the antenna elements 2102-1 to 2102-N may have substantially the same construction in terms of shape, size, and material(s). The antenna elements 2102-1 to 2102-N may each respectively be configured to operate as a radiator of generally circularly-polarized electromagnetic waves of the same sense (i.e., either generally left hand circularly-polarized electromagnetic waves or generally right-hand circularly-polarized electromagnetic waves, not both). The antenna elements 2102-1 to 2102-N may each include a respective patch, dipole, slot, resonator, etc. In some examples, the antenna elements 2102-1 to 2102-N include two dielectric resonator elements, each of which may be shaped respectively as: a cuboid, a cube, a right or oblique prism (polygonal, e.g., rectangular, rhombic, trapezoidal, pentagonal, hexagonal, etc.), a right or oblique cylinder (e.g., circular, elliptic, oblong, obround, oval, etc.), etc. In some examples, the dielectric resonator elements each includes a generally cuboidal or generally cubic body, optionally partly chamfered. In some examples, the separation between the two dielectric resonator elements may be less than $0.5\lambda_0$, less than $0.4\lambda_0$, or about $0.3\lambda_0$ (e.g., $0.33\lambda_0$), where $\lambda_0$ is wavelength in air at a center frequency of operation frequency band of the antenna 2100. The antenna elements 2102-1 to 2102-N may be additively manufactured. The antenna elements 2102-1 to 2102-N may each be made of one or more dielectric materials. The different antenna elements 2102-1 to 2102-N may have the same dielectric constant or effective dielectric constant.

The decoupler arrangement 2104 is configured (e.g., sized and/or shaped and/or oriented and/or located) to prevent or reduce mutual coupling of the antenna elements 2102-1 to 2102-N when one or more (e.g., all) of the antenna elements 2102-1 to 2102-N are operated as radiator. In some embodiments, the decoupler arrangement 2104 has a dielectric decoupler receiving or covering, at least part of, or all of, each of the antenna elements 2102-1 to 2102-N. The dielectric decoupler may include a dielectric member (e.g., dielectric block) made of one or more dielectric material(s). In some embodiments, the dielectric member may include one or more layers or portions, each made of one or more dielectric material(s). The dielectric material(s) may each be in solid (bulk, powder, etc.) or liquid form. In some examples, the dielectric member has multiple layers and the dielectric constant or effective dielectric constant of the layers generally decreases (i.e., a tendency to decrease, not necessarily monotonically decrease) away from the antenna elements 2102-1 to 2102-N. In some examples, the dielectric member has a body and one or more holes formed in the body to receive the antenna elements 2102-1 to 2102-N. The body of the dielectric member may be shaped as: a cuboid, a cube, a right or oblique prism (polygonal, e.g., rectangular, rhombic, trapezoidal, pentagonal, hexagonal, etc.), a right or oblique cylinder (e.g., circular, elliptic, oblong, obround, oval, etc.), etc. The one or more holes may each be a blind-hole, and which may be shaped to correspond to the shape of the antenna elements 2102-1 to 2102-N (e.g., the same shape, with the same size or different sizes). In some examples, the body has multiple holes each for a respective one of the antenna elements 2102-1 to 2102-N. The decoupler arrangement 2104, or the dielectric member, may be additively manufactured. The decoupler arrangement 2104, or the dielectric member, may have a dielectric constant or effective dielectric constant less than the dielectric constant or effective dielectric constant of the antenna elements 2102-1 to 2102-N.

In some embodiments, the antenna 2100 also has a polarizer arrangement operably coupled with the antenna elements 2102-1 to 2102-N and configured to affect polarization of electromagnetic waves provided by one or more of the antenna elements 2102-1 to 2102-N when it is or they are operated as radiator. The polarizer arrangement may be connected with the decoupler arrangement 2104. In some examples, the polarizer arrangement may be at least partly integrated with the decoupler arrangement 2104 such that the polarizer arrangement may operate as part of the decoupler arrangement 2104. In some examples, the polarizer arrangement and the decoupler arrangement may be integrally formed. In some embodiments, the polarizer arrangement is a circular polarization polarizer arrangement configured to facilitate or enhance circular polarization (e.g., left hand or right hand) of electromagnetic waves provided by one or more of the antenna elements 2102-1 to 2102-N. In some examples, the polarizer arrangement includes multiple dielectric polarizer members that are spaced apart. The dielectric polarizer members may each be shaped as: a cuboid, a cube, a right or oblique prism (polygonal, e.g., rectangular, rhombic, trapezoidal, pentagonal, hexagonal, etc.), a right or oblique cylinder (e.g., circular, elliptic, oblong, obround, oval, etc.), etc. In some example, the polarizer arrangement includes multiple dielectric slabs that are spaced apart and are arranged generally in parallel with a polarizer arrangement axis. The dielectric slabs may each be shaped as a cuboid or a cube and/or may have generally the same height. The height(s) of the dielectric slabs may be smaller than a height of the dielectric member or the decoupler arrangement 2104. The polarizer arrangement may have a dielectric constant or effective dielectric constant less than the dielectric constant or effective dielectric constant of the decoupler arrangement 2104, or the dielectric member. In some examples, the dielectric polarizer members or slabs themselves have generally the same dielectric constant or effective dielectric constant as the dielectric member or the decoupler arrangement 2104, but the dielectric polarizer members or slabs are constructed (e.g., spaced apart) such that the effective dielectric constant of the polarizer arrangement is generally the same as the dielectric constant or effective dielectric constant of the dielectric member or the decoupler arrangement 2104. The polarizer arrangement, or the dielectric polarizer members or slabs, may be additively manufactured.

In some embodiments, the antenna 2100 also has a feed arrangement for the antenna elements 2102-1 to 2102-N. The feed arrangement may include multiple feeds each configured for a respective antenna element 2102-1 to 2102-N. One or more of the feeds may include a slot feed mechanism. The antenna 2100 also has a substrate with two sides, and a ground plane on one side of the substrate and on which the antenna elements 2102-1 to 2102-N may be arranged. Each of the feeds may include a slot (e.g., rectangular, cross shaped, fractal shaped, etc.) arranged on the ground plane and on which a respective one of the antenna elements 2102-1 to 2102-N is placed, a feedline circuit (with one or more feedlines) arranged on the side of the substrate opposite the ground plane and operably coupled with the slot, and a port operably coupled with the feedline circuit.

The antenna 2100 can operate at X-band (e.g., in at least some frequencies in about 8.0 GHz to about 12.0 GHz). Depending on implementations, the antenna 2100 can be operated as a transmit antenna, a receive antenna, or a transceiver antenna. The antenna 2100 may be included in a system/device (e.g., a communication system/device that can perform wireless communication, an IoT system/device, a satellite communication system/device, a multiple-in multiple-out (MIMO) antenna system/device). The system/device may be standalone, portable, or handheld.

Figure 22:
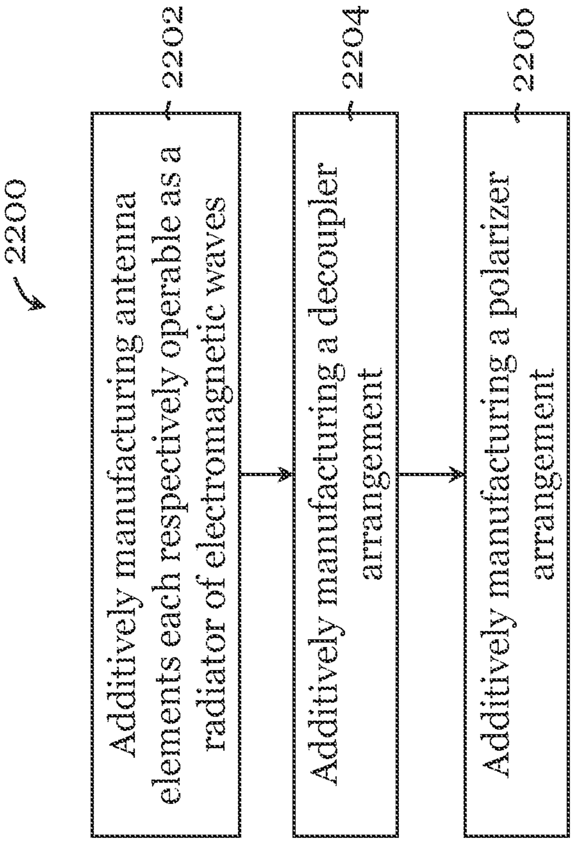
FIG. 22 is a flowchart illustrating a method for making a part of an antenna in some embodiments of the invention.

FIG. 22 shows a method 2200 for making a part for an antenna, such as the antenna 2100.

The method 2200 includes, in step 2202, additively manufacturing multiple antenna elements each respectively operable as a radiator of electromagnetic waves, and in step 2204, additively manufacturing a decoupler arrangement. The antenna elements and the decoupler arrangement may be the same as those described with reference to the antenna 2100. In some embodiments, steps 2202 and 2204 are performed separately (e.g., sequentially, one after another). In some embodiments, at least part of step 2202 and at least part of step 2204 may be performed substantially simultaneously. In step 2202, the antenna elements may be additively manufactured using one or more dielectric materials, and, in step 2204, the decoupler arrangement may be additively manufactured using one or more dielectric materials, such that the decoupler arrangement has a smaller dielectric constant or effective dielectric constant compared with the antenna elements. In some embodiments, the method 2200 further includes, in step 2206, additively manufacturing a polarizer arrangement such that the polarizer arrangement is operably coupled with the antenna elements and configured to affect polarization of electromagnetic waves provided by one or more of the antenna elements when one or more of the antenna elements are operated as radiator. The part for the antenna may further comprise the polarizer arrangement. The additive manufacturing of the decoupler arrangement and the additive manufacturing of the polarizer arrangement may be arranged such that the decoupler arrangement and the polarizer arrangement are integrally formed. In some embodiments, the polarizer arrangement and the decoupler arrangement are additively manufactured using the same dielectric material(s).

The part of the antenna made from method 2200 may be arranging on a ground plane of an assembly to form an antenna, such as the antenna 2100. The assembly may include a substrate with opposite sides, a ground plane arranged on one side of the substrate, and a feed mechanism with multiple feeds each for a respective antenna element.

The following provides some example embodiments of the antenna 2100 and method 2200. It should be noted that the invention is not limited to the example embodiments.

Inventors of the present invention have devised, through their research, that circularly polarized (CP) antennas are used in satellite communications and space telemetry applications, and they allow more flexible orientations of the transmitting and receiving antennas as well as mitigate problems associated with multi-path interferences and fading. Inventors of the present invention are aware that circularly polarized multi-input-multi-output antenna designs can generally be classified into two types: one type is single-sense circularly polarized multi-input-multi-output antenna with all elements being either left-hand or right-hand circularly polarized antennas, another type is dual-sense circularly polarized multi-input-multi-output antenna with one or more left-hand circularly polarized antenna elements and one or more right-hand circularly polarized antenna elements. Inventors of the present invention are aware that it is generally more challenging to design a single-sense circularly polarized multi-input-multi-output antenna than the dual-sense circularly polarized multi-input-multi-output antenna because the mutual coupling of the latter is inherently weaker due to the orthogonality between its left- and right-hand circularly polarized fields. The following embodiments of the invention concern a single-sense circularly polarized multi-input-multi-output antenna.

Figure 1A:
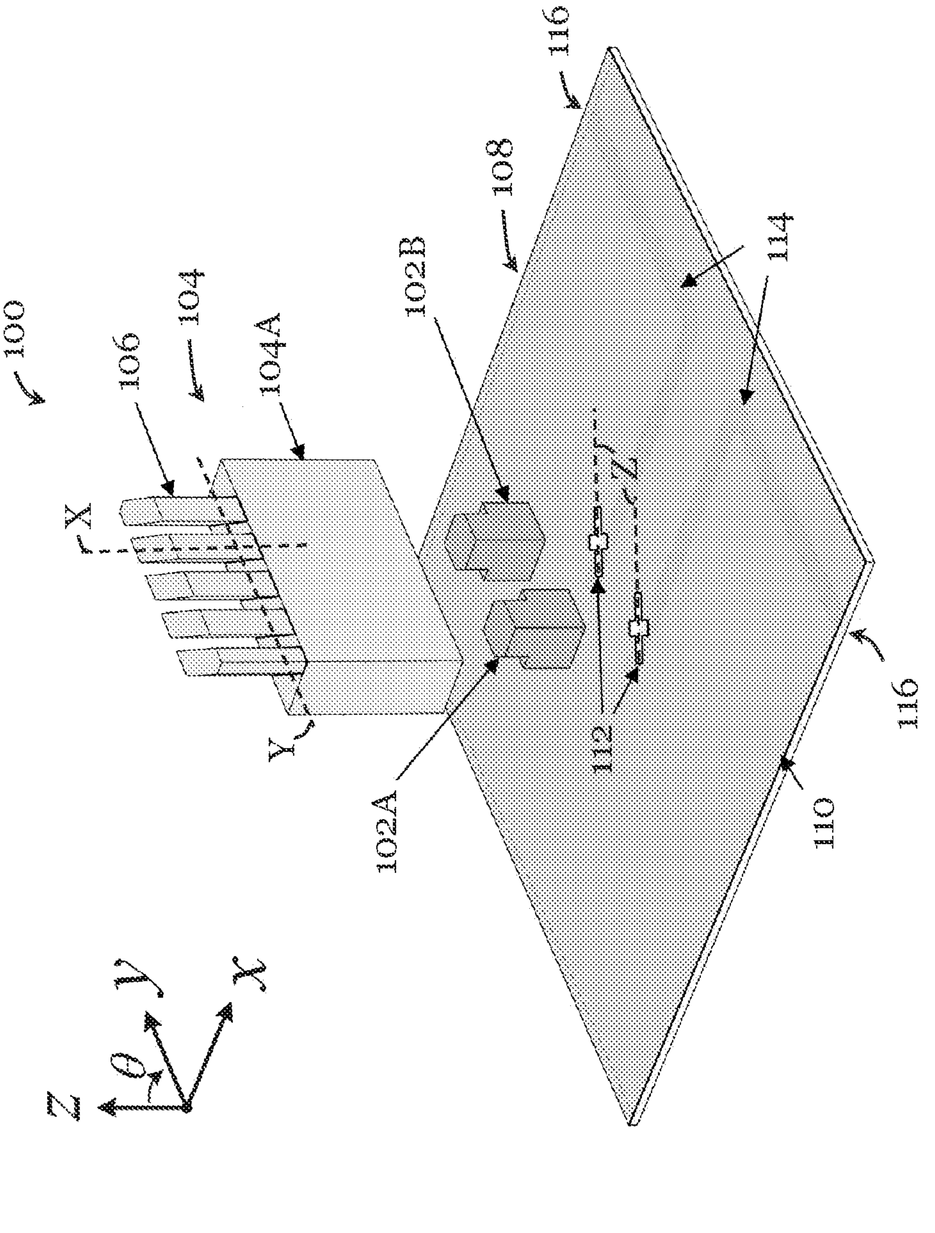
FIG. 1A is a part-exploded view of an antenna in one embodiment of the invention.
Figure 1B:
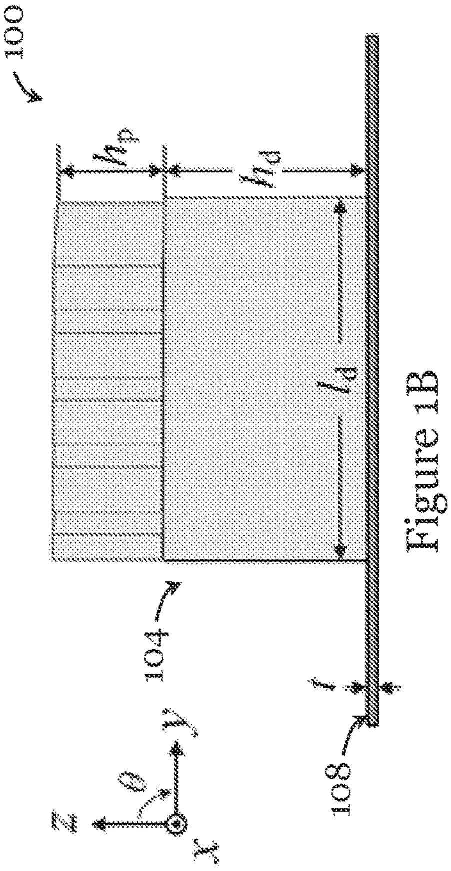
FIG. 1B is a side view of the antenna of FIG. 1A.
Figure 1C:
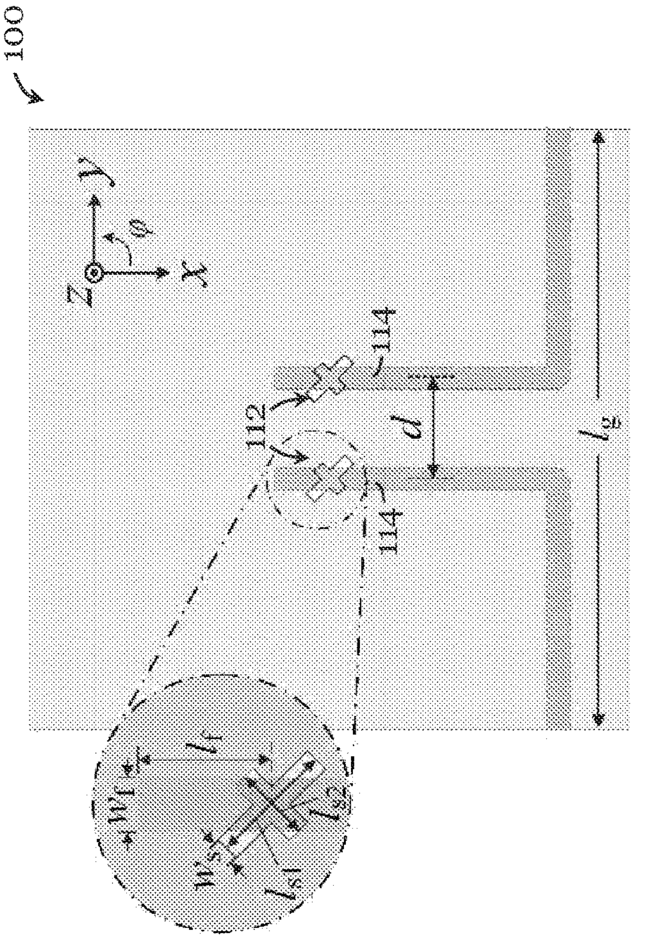
FIG. 1C is a schematic diagram of the feed arrangement of the antenna of FIG. 1A.

FIGS. 1A to 1C show an antenna 100 in one embodiment of the invention. As mentioned, the antenna 100 can be considered as an example of the antenna 2100. In this embodiment, the antenna 100 is a wideband circularly polarized multi-input-multi-output antenna.

The antenna 100 includes two dielectric resonator elements 102A, 102B, as antenna elements, each operable as a radiator of circularly polarized electromagnetic waves of the same sense (e.g., in this example, left-hand). The dielectric resonator elements 102A, 102B have generally the same construction (shape, size, material) and are spaced apart by distance d with respect to their respective centers. The dielectric resonator elements 102A, 102B each has a generally cuboidal body, which includes a lower cuboidal portion and a corresponding upper chamfered cuboidal portion (shaped to form a generally hexagonal prism portion). The upper chamfered cuboidal portion has opposed chamfered edges each having a respective chamfer angle of about 45 degrees. In this example, the dielectric resonator elements 102A, 102B are additively made with dielectric material having a dielectric constant $\varepsilon_{r1}$ of 12. In this example, the dielectric resonator elements 102A, 102B both generate left-hand circularly polarized fields.

The antenna 100 also includes a dielectric decoupler 104 configured (e.g., sized and/or shaped and/or oriented and/or located) to prevent or reduce mutual coupling of the dielectric resonator elements 102A, 102B when the dielectric resonator elements 102A, 102B are operated as radiators. In this embodiment, the dielectric decoupler includes a dielectric block 104A receiving or covering the dielectric resonator elements 102A, 102B. The dielectric block 104A includes a body with length $l_d$, width $w_d$, and height $h_d$, and holes formed in the body and receiving the dielectric resonator elements 102A, 102B. As shown in FIG. 1A, the body of the dielectric block 104A is generally cuboidal, and the holes may be shaped to correspond to the dielectric resonator elements 102A, 102B. The dielectric block 104A is additively made with dielectric material having a dielectric constant $\varepsilon_{r2}$ of 5.

The antenna 100 also includes a polarizer arrangement 106 operably coupled with the dielectric resonator elements 102A, 102B and configured to affect polarization of electromagnetic waves provided by the dielectric resonator elements 102A, 102B when they are operated as radiators. In this embodiment, the polarizer arrangement 106 is integrally formed with the dielectric block 104A, on the top of the dielectric block 104A, and the polarizer arrangement 106 is at least partly integrated with the dielectric decoupler 104 such that the polarizer arrangement 106 may operate as part of the dielectric decoupler 104. In this embodiment, the polarizer arrangement 106 is a circular polarization polarizer arrangement configured to facilitate or enhance circular polarization of electromagnetic waves (the same sense) provided by the dielectric resonator elements 102A, 102B. As shown in FIG. 1A, the polarizer arrangement 106 includes five spaced apart generally cuboidal dielectric slabs arranged generally in parallel with a polarizer arrangement axis X. The generally cuboidal dielectric slabs have generally the same height $h_p$. The polarizer arrangement axis X extends at about 45 degrees with respect to a generally horizontal axis Y along with the dielectric block 104A extends. The dielectric slabs of the polarizer arrangement 106 may be additively made with dielectric material having a dielectric constant $\varepsilon_{r2}$ of 5. The effective dielectric constant of the polarizer arrangement 106 (considering also the air gaps between the slabs) may be less than the dielectric constant $\varepsilon_{r2}$ of 5.

In this embodiment, the dielectric resonator elements 102A, 102B and the dielectric decoupler 104 (dielectric block 104A and polarizer arrangement 106) are integrally formed (e.g., additively made) as a single piece, e.g., using an additive manufacturing machine operable to simultaneously print using two or more dielectric materials.

As shown in FIGS. 1A to 1C, the antenna 100 further includes a substrate 108 with a ground plane 110 arranged on top. In this embodiment, the substrate 108 is a double-sided substrate (with upper and lower copper claddings), with length $l_g$, thickness t, dielectric constant 2.20, and loss tangent 0.0009. The upper copper cladding provides the ground plane 110.

The antenna 100 also includes a feed arrangement with two feeds, each for a respective dielectric resonator elements 102A, 102B. With reference to FIG. 1A, each of the feeds respectively includes: a generally cross-shaped slot 112 arranged on (e.g., formed or etched in) the ground plane 110, a feedline circuit with a generally L-shaped microstrip feedline 114 arranged on the side of the substrate 108 opposite the ground plane 110, and a port 116 coupled with the feedline circuit. As best shown in FIG. 1C, in plan view the slot 112 overlaps with part of the generally L-shaped feedline 114. In this embodiment, the generally cross-shaped slot 112 has a longer generally rectangular slot portion and a shorter generally rectangular slot portion that are arranged generally perpendicularly. The longer generally rectangular slot portion elongates along a long axis Z that is generally perpendicular to the polarizer arrangement axis X. The generally cross-shaped slot 112 has width $w_s$ and lengths $l_{s1}$, $l_{s2}$. The generally L-shaped microstrip feedline 114 has a width $w_f$ and is arranged (e.g., printed) on another side of the substrate 108. In this example, the ports for the dielectric resonator elements 102A, 102B may include RF connectors. In this example, the ports for the dielectric resonator elements 102A, 102B are arranged on opposite edges of the substrate 108. The dielectric resonator elements 102A, 102B and the dielectric decoupler 104 are mounted on the ground plane 110, aligned with the generally cross-shaped slots 112.

In this example, the antenna 100 is configured to operate at X-band (e.g., in at least some frequencies in about 8.0 GHz to about 12.0 GHz). Table I lists some parameters of the antenna 100 in this embodiment.

TABLE 1

Parameters of antenna 100

| $\varepsilon_{r1}$ | $\varepsilon_{r2}$ | $h_p$ | $h_d$ | $l_d$ | t | d |
|---|---|---|---|---|---|---|
| 12 | 5 | 7 mm | 13 mm | 23 mm | 0.787 mm | 10 mm |

| $l_g$ | $l_{s1}$ | $l_{s2}$ | $w_s$ | $w_f$ | $l_f$ |
|---|---|---|---|---|---|
| 60 mm | 3.3 mm | 5.5 mm | 1.2 mm | 2.2 mm | 5.3 mm |

Figure 2:
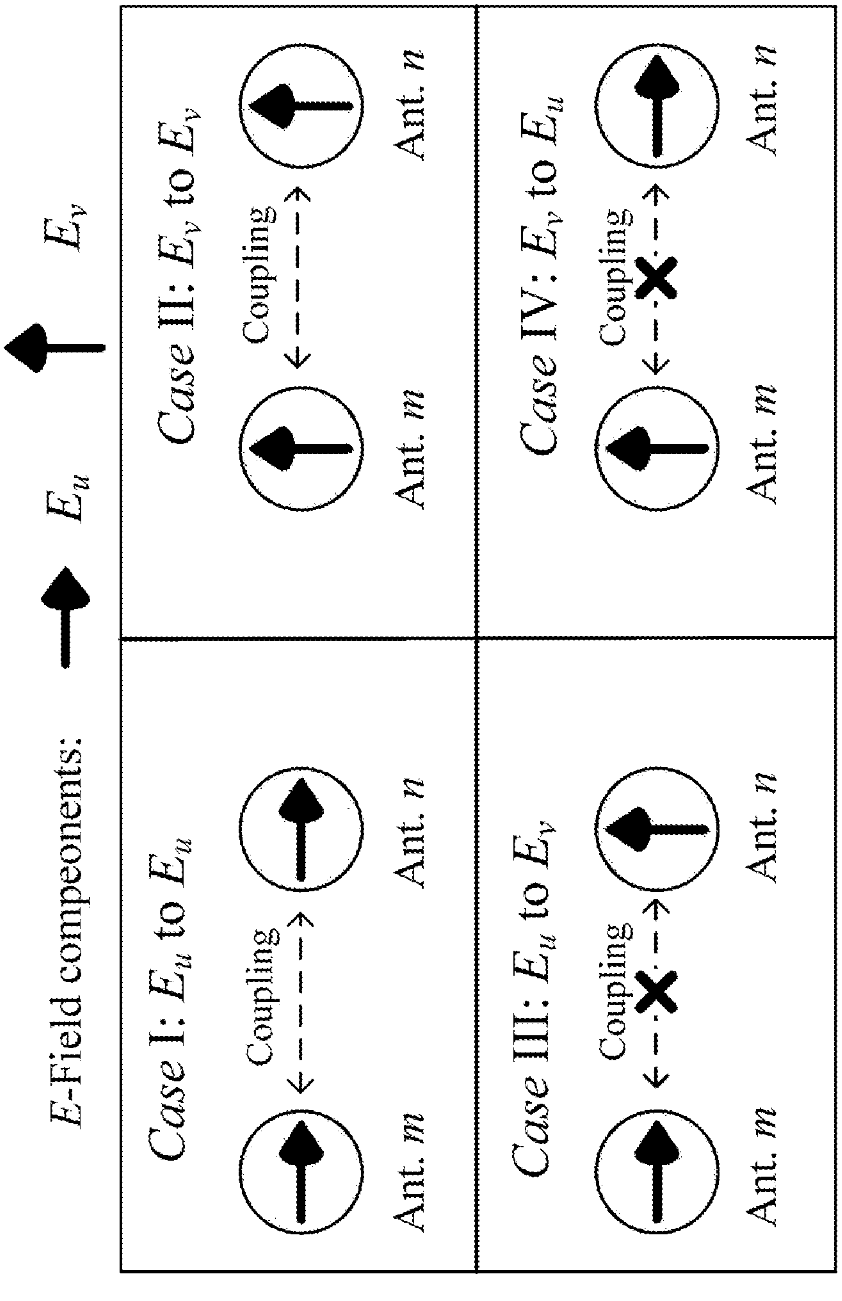
FIG. 2 is a schematic diagram illustrating 4 example cases of mutual coupling between two antenna elements.

To facilitate understanding of the operation of the decoupling in some embodiments of the invention, the following describes principle of the decoupling method. FIG. 2 shows 4 example cases of mutual coupling between two generally identical circularly polarized antenna elements. As shown in FIG. 2, to study the coupling between two generally identical circularly polarized antenna elements, the total E-field of the two circularly polarized electromagnetic waves is decomposed into two orthogonal components ($E_u$ and $E_v$). FIG. 2 shows four coupling cases: (Case I) $E_u$ of Ant. m coupled to $E_u$ of Ant. n; (Case II) $E_v$ of Ant. m coupled to $E_v$ of Ant. n; (Case III) $E_u$ of Ant. m coupled to $E_v$ of Ant. n; (Case IV) $E_v$ of Ant. m coupled to $E_u$ of Ant. n. Since $E_u$ and $E_v$ are orthogonal, their mutual coupling is in theory zero (in practice, relatively small) and is therefore excluded from this discussion. As a result, only Case I (two u-directed electric-field components) and Case II (two v-directed electric-field components) are considered in more detail.

Figure 3:
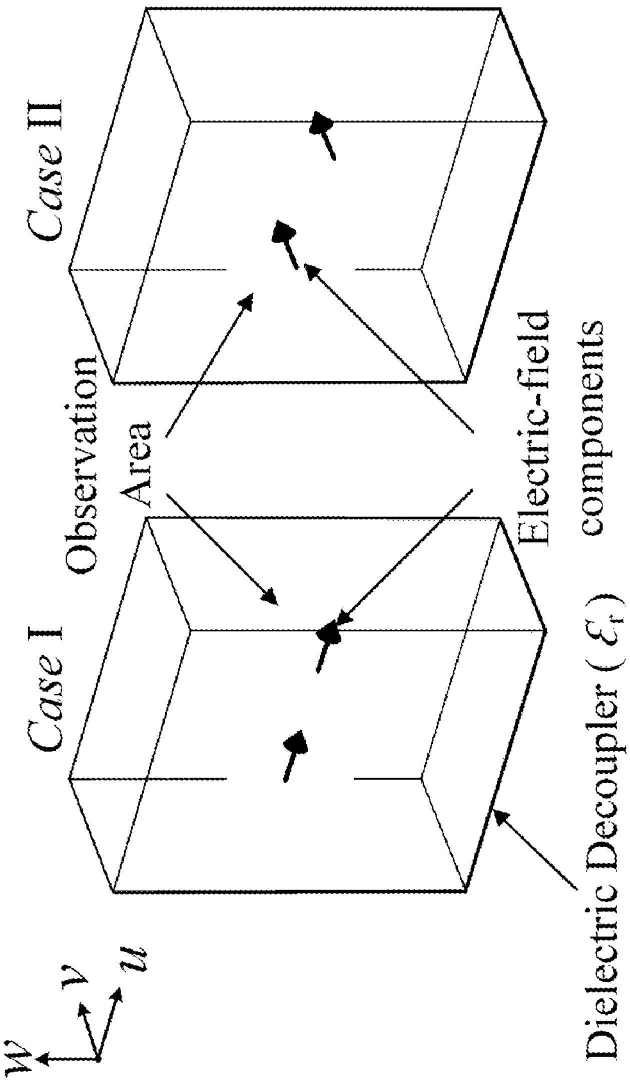
FIG. 3 is a schematic diagram illustrating a decoupling model with a dielectric decoupler (for reducing mutual coupling between two antenna elements)

FIG. 3 shows a decoupling model with a dielectric decoupler (for reducing mutual coupling between two antenna elements). Here, a dielectric decoupler is introduced to obtain ‘field valleys’, where the E-field is weak, to suppress coupling between the two circularly polarized antenna elements.

To illustrate the design process of the antenna 100, three intermediate antennas (Ant. I-III) are studied and compared.

Figure 4:
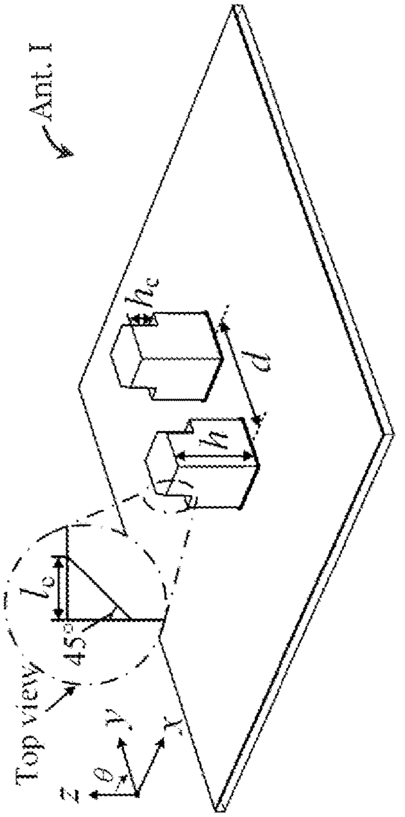
FIG. 4 is a schematic diagram of an antenna design in a first design stage ("Ant. I") in one embodiment of the invention.

FIG. 4 shows the configuration of an antenna design in a first design stage (Ant. I) arranged to operate at X-band. With reference to FIG. 4, two 45° chamfered rectangular dielectric resonator antenna elements arranged on a substrate are used to obtain a wider axial-ratio (AR) bandwidth. These elements have a dielectric constant $\varepsilon_{r1}$, width w, and height h, and are separated by d from each other (with respect to their centers). The parameters used in the antenna design (Ant. I) in this example are: h=6 mm, $h_c$=2 mm, w=5.4 mm, d=10 mm, and $l_c$=2.3 mm.

Figure 5:
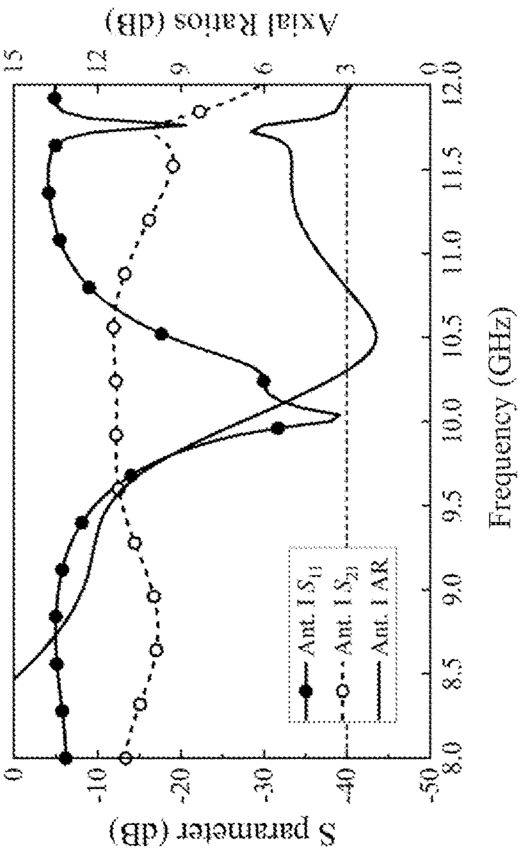
FIG. 5 is a graph showing simulated S-parameters $S_{11}$, $S_{21}$ and axial ratios (dB) of the antenna design in the first design stage ("Ant. I") at different frequencies (GHz)

FIG. 5 shows the simulated S-parameters and axial ratios (ARs) of Ant. I. As shown in FIG. 5 the two circularly polarized dielectric resonator antenna elements have a relatively strong mutual coupling (about −12 dB) and a relatively narrow axial ratio bandwidth (4.8%).

Figure 6:
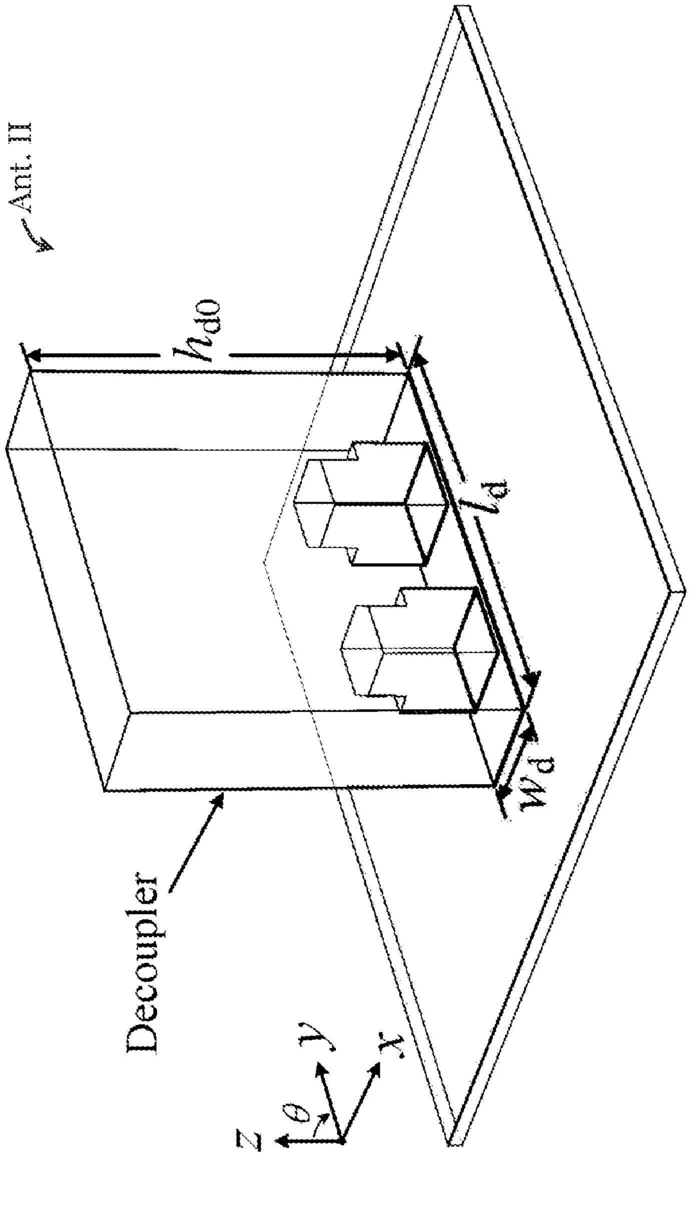
FIG. 6 is a schematic diagram of an antenna design in a second design stage ("Ant. II") in one embodiment of the invention.

To reduce the mutual coupling, in the second design stage, a dielectric decoupler with a dielectric constant of $\varepsilon_{r2}$ is used to cover the two 45° chamfered rectangular dielectric resonator antenna elements of the antenna design Ant. I. FIG. 6 shows the antenna design in the second design stage ("Ant. II"). The parameters used in the antenna design (Ant. II) in this example are: $h_{do}$=20 mm, $w_d$=5.6 mm, $l_d$=23 mm, h=6 mm, $h_c$=2 mm, w=4.4 mm, d=10 mm, and $l_c$=1.3 mm.

Figure 7A:
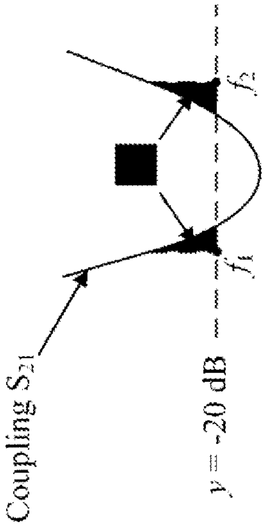
FIG. 7A is a schematic diagram illustrating determination of mutual coupling level in the antenna design in the second design stage ("Ant. II")
Figure 7B:
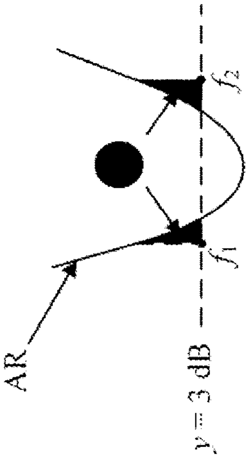
FIG. 7B is a schematic diagram illustrating determination of axial ratios in the antenna design in the second design stage ("Ant. II")
Figure 7C:
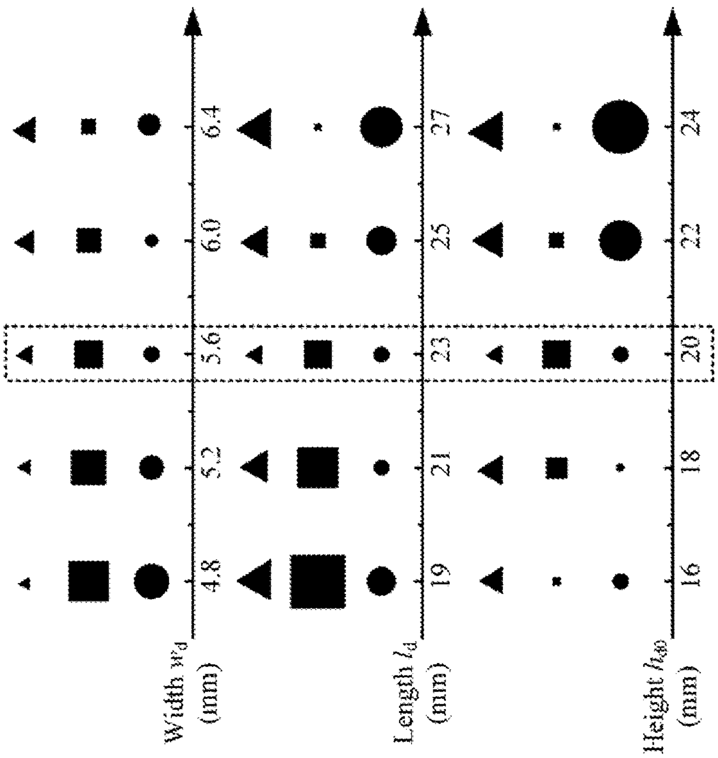
FIG. 7C is a plot showing performance of the dielectric decoupler in the antenna design in the second design stage ("Ant. II") for different dielectric decoupler dimensions (width $w_d$, length $l_d$, and height $h_{do}$)

In this example, the parameters of the dielectric decoupler (loading structure) are optimized to obtain the same operating band for Ant. II. Their optimized values are listed above. In this example, three metrics are used to evaluate the performance of the decoupler: gain fluctuation, mutual coupling level, and axial ratio bandwidth. In FIGS. 7A to 7C, area of a triangular marker is used to represent the standard deviation of gain—the larger the marker, the stronger the fluctuation. The mutual coupling level is measured by the area between the $S_{21}$ curve and the y (mutual coupling)>−20 dB curve across the required frequency band ($f_1$:9 GHz to $f_2$:11 GHz), as shown in FIG. 7A. Ideally, this area should be zero because the mutual coupling should be less than −20 dB across the frequency band. In other words, a smaller marker means a better decoupling performance. The axial ratio is measured with a similar method (see FIG. 7B), and, the smaller the area, the wider the circular polarization bandwidth. FIG. 7C shows the performance of the decoupler with different design parameters of $w_d$, $l_d$, $h_{do}$ (the parameters are defined in FIG. 6). With reference to FIG. 7C, each of the different design parameters of $w_d$, $l_d$, $h_{do}$ has different effects on the gain fluctuation, coupling level, and axial ratio bandwidth. As a compromise among the three metrics, the values of $w_d$=5.6 mm, $l_d$=23 mm, and $h_{do}$=20 mm are chosen for the antenna design Ant. II in this example. In FIGS. 7A to 7C, generally, the smaller the marker, the better the performance.

Figure 8:
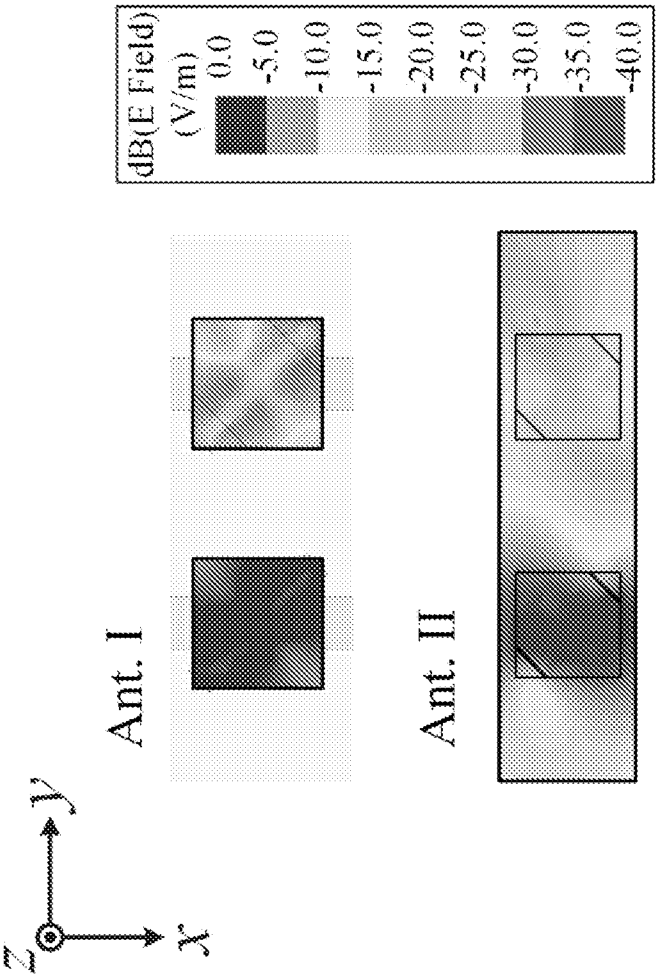
FIG. 8 is a plot showing distribution of normalized E-field magnitudes of the antenna design in the first design stage ("Ant. I") and the antenna design in the second design stage ("Ant. II")

FIG. 8 shows distributions the normalized E-field magnitudes of the two antenna designs Ant. I and optimized Ant. II when the two dielectric resonator antenna element 1s are excited. As shown in FIG. 8, the coupled E-field in one of the dielectric resonator antenna elements of Ant. II is weakened by using the dielectric decoupler. This illustrates the effectiveness of the decoupler.

Figure 9A:
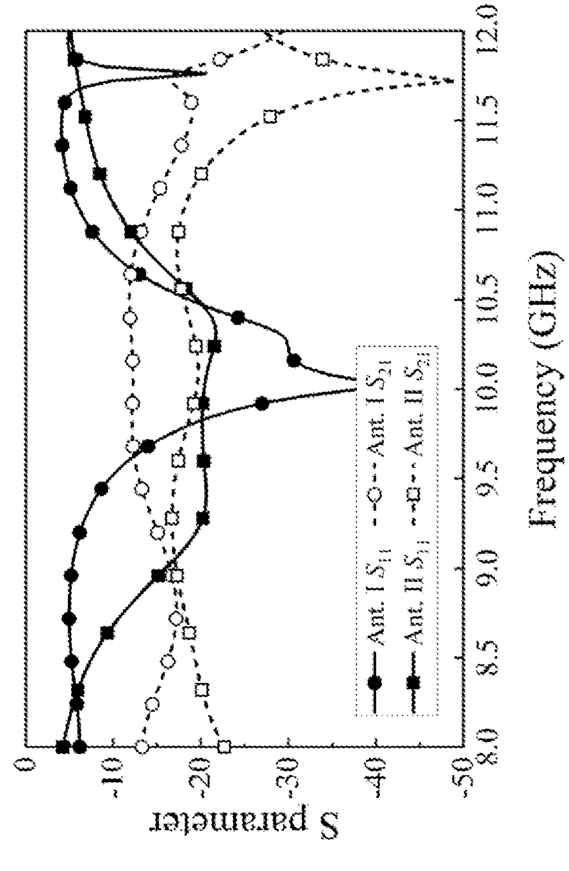
FIG. 9A is a graph showing S-parameters $S_{11}$, $S_{21}$ (dB) of the antenna design in the first design stage ("Ant. I") and the antenna design in the second design stage ("Ant. II") at different frequencies (GHz)
Figure 9B:
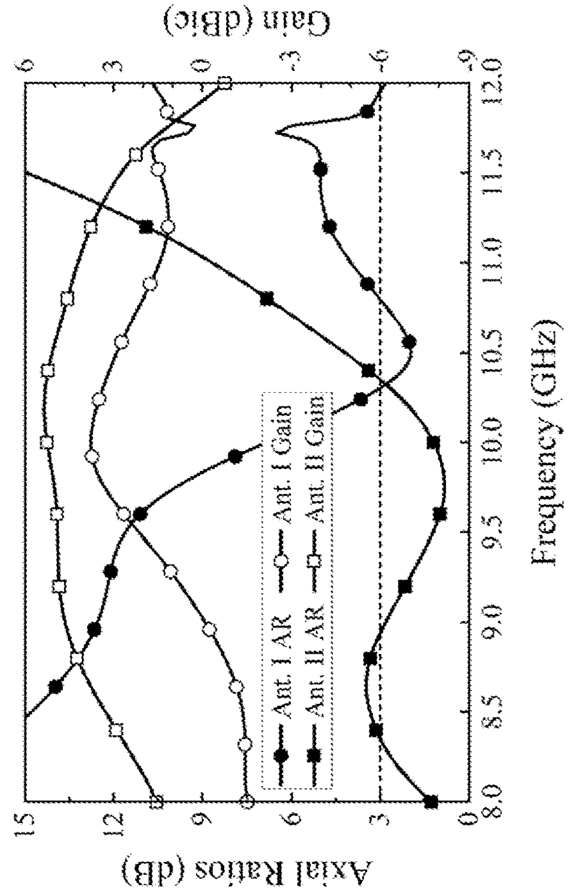
FIG. 9B is a graph showing axial ratios (dB) and gain (dBic) of the antenna design in the first design stage ("Ant. I") and the antenna design in the second design stage ("Ant. II") at different frequencies (GHz)

FIGS. 9A and 9B show comparison of the S-parameters, axial ratios and gains of the two antenna designs Ant. I and Ant. II. As shown in FIG. 9A, $|S_{21}|$ of Ant. II is smaller than that of Ant. I, which is consistent with the above disclosure. For Ant. II, the coupling less than −15 dB across the entire frequency band. At 10.1 GHZ, its $|S_{21}|$ is lower than that of Ant. I by 7.5 dB. Also, it can be seen from FIG. 9A that Ant. II has a wider impedance bandwidth (8.68-11.04 GHz) than that of Ant. I. As shown in FIG. 9B, Ant. II has a wider axial ratio bandwidth and a higher, flatter gain due to the reduced mutual coupling.

Although Ant. II is better than Ant. I, it fails to obtain 20-dB isolation but only 15 dB isolation across the entire operating band. To address this problem, a two-layer decoupler with different dielectric constants ($\varepsilon_{r2}$ and $\varepsilon_{r3}$) is introduced in the next (third design stage).

Figure 10:
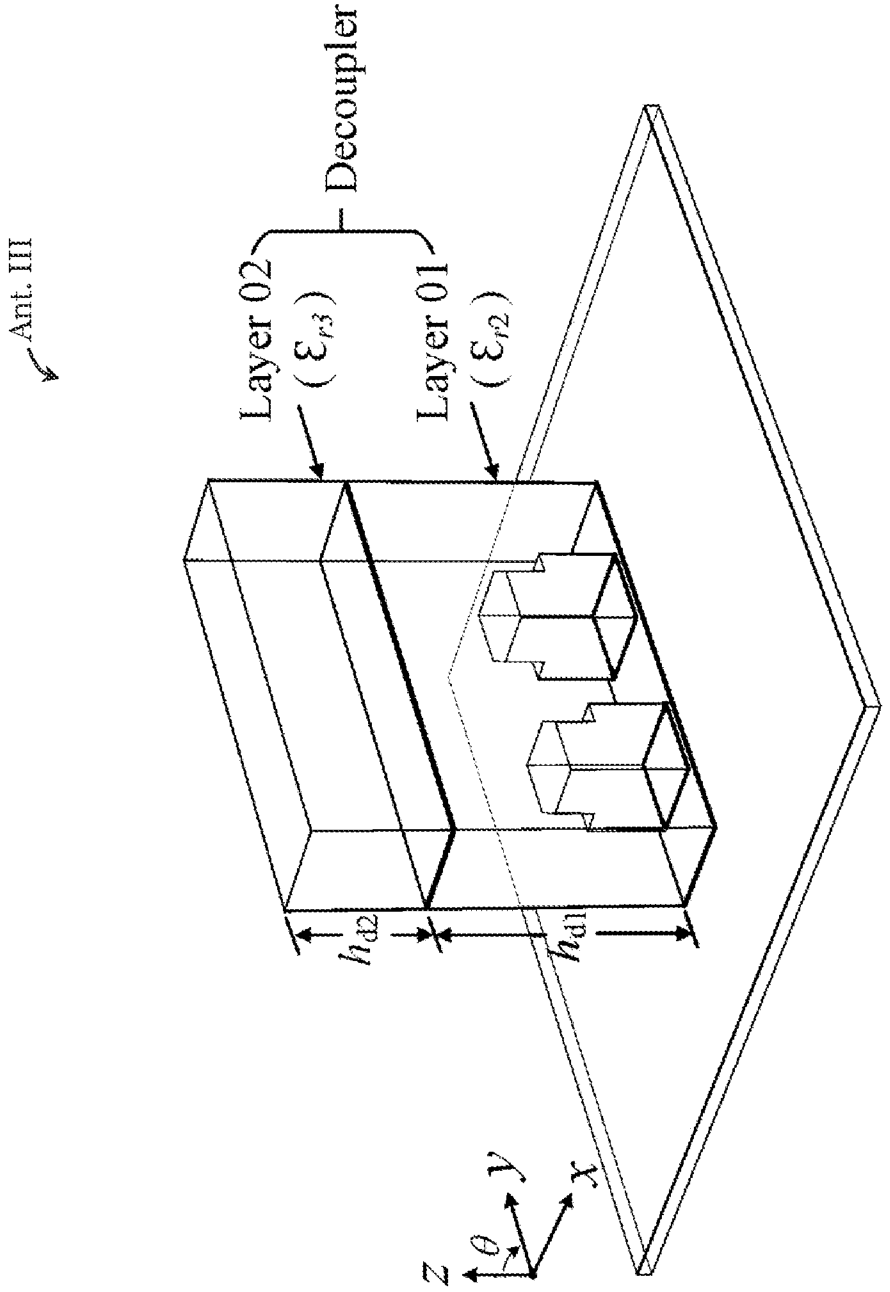
FIG. 10 is a schematic diagram of an antenna design in a third design stage ("Ant. III") in one embodiment of the invention.

FIG. 10 shows the antenna design in the third design stage ("Ant. III"). The parameters used in the antenna design (Ant. II) in this example are: $\varepsilon_{r2}$=5, $\varepsilon_{r3}$=3, $h_{d1}$=13 mm, $h_{d2}$=7 mm (while the other parameters are the same of those of Ant. II).

With reference to FIG. 10, the upper part of the decoupler is replaced by another material with a lower dielectric constant $\varepsilon_{r3}$, whereas the lower part of the decoupler remains unchanged. The effect of the upper part is investigated.

Figure 11B:
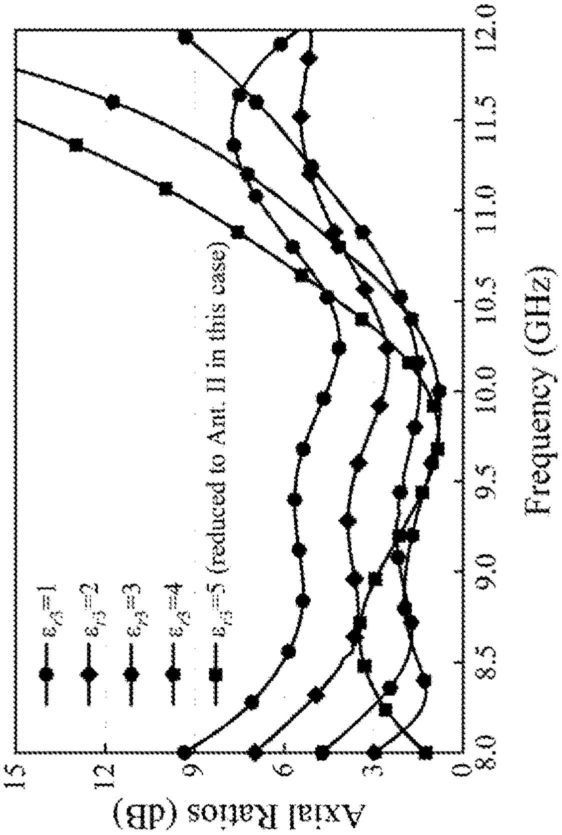
FIG. 11B is a graph showing axial ratios (dB) of the antenna design in the third design stage ("Ant. III") at different frequencies for the upper layer (layer 02) with different dielectric constants $\varepsilon_{r3}$.
Figure 11A:
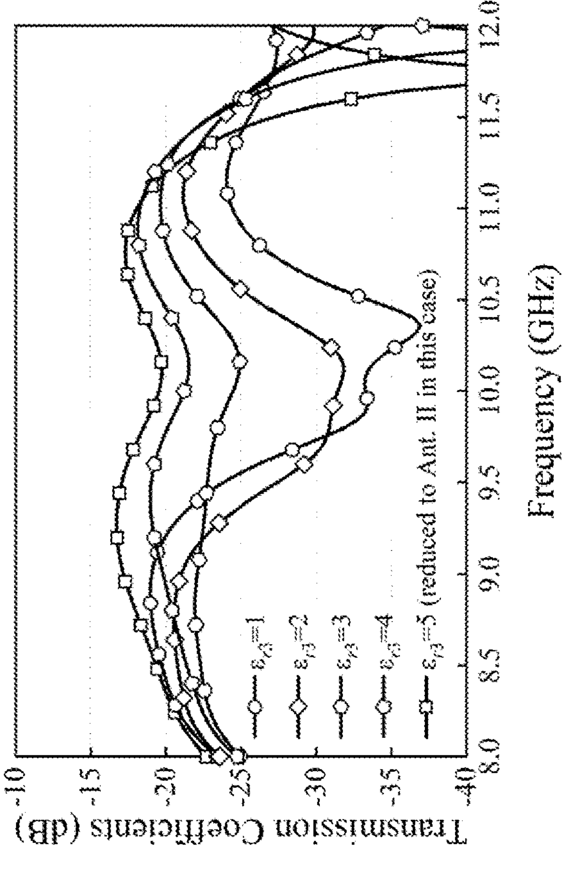
FIG. 11A is a graph showing S-parameter $S_{21}$ (transmission coefficients, dB) of the antenna design in the third design stage ("Ant. III") at different frequencies for the upper layer (layer 02) with different dielectric constant $\varepsilon_{r3}$.

FIGS. 11A and 11B show the performance (S-parameter $S_{21}$ (transmission coefficients, dB) and axial ratios (dB)) of the antenna design Ant. III for different $\varepsilon_{r3}$. As shown in FIG. 11A, the coupling level increases with an increase in the values of $\varepsilon_{r3}$. As shown in FIG. 11B when $\varepsilon_{r3}$=1 and 2, a poor axial ratio is obtained. Thus, in this example, $\varepsilon_{r3}$=3 is used for Ant. III.

Figure 12:
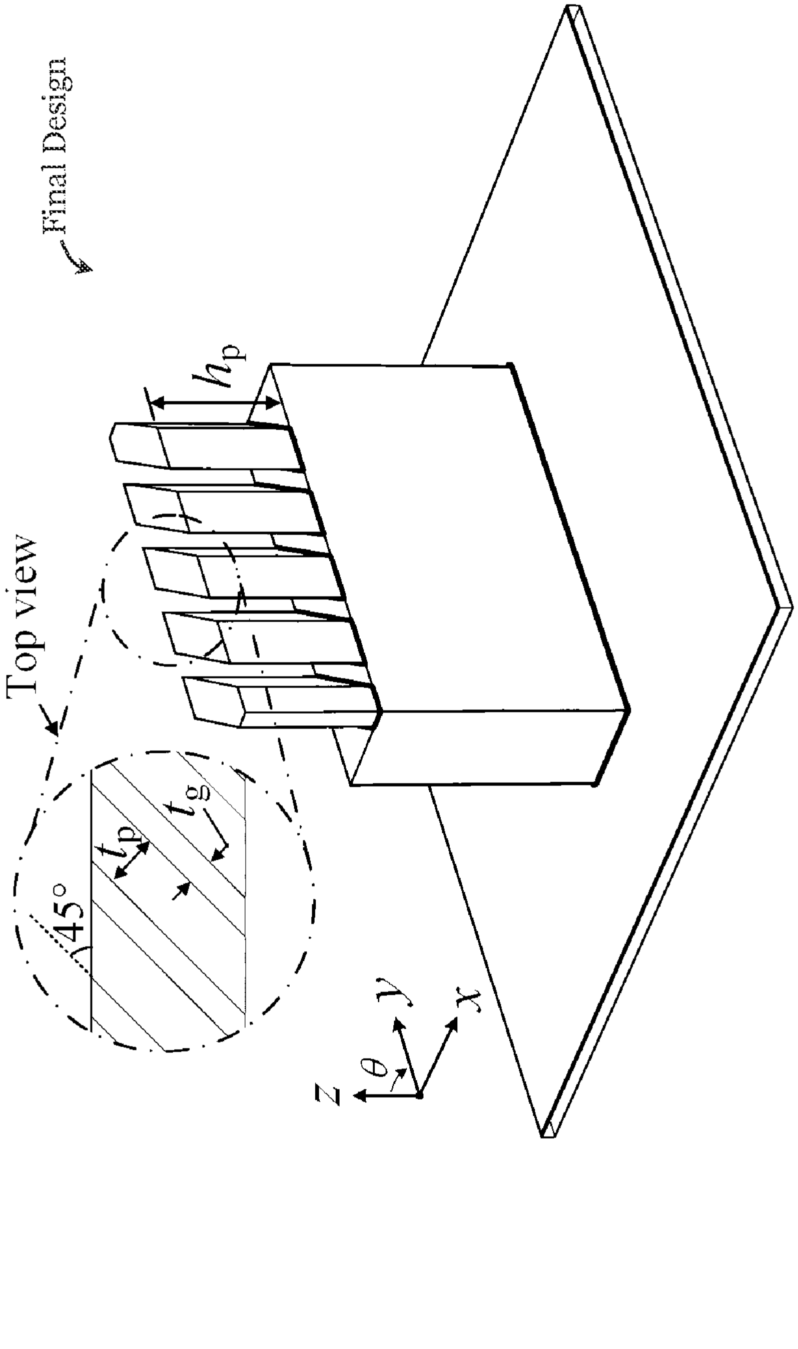
FIG. 12 is a schematic diagram of an antenna design in a final (fourth) design stage ("Final design") in one embodiment of the invention.

To improve the axial ratio bandwidth, the upper part of the decoupler is replaced with a circular polarization polarizer that comprises serval dielectric slabs in the next (fourth) design stage, giving the final design. FIG. 12 shows the antenna design in the final (fourth) design stage ("Final design"). In this design, the dielectric slabs has height $h_p$, thickness $t_p$, and inclination angle 45°. The parameters used in the antenna design (Final design) in this example are: $h_p$=7 mm, $t_p$=2 mm, and $t_g$=1 mm (while the other parameters are the same of those of Ant. III).

In this example, to fabricate the whole polarizer-integrated dielectric decoupler with $\varepsilon_{r2}$, the polarizer is designed in such a way that its equivalent dielectric constant is equal to $\varepsilon_{r3}$ to enhance the decoupler effect (see description of Ant. III). In the configuration, the gap between the adjacent slabs is $t_g$.

Figure 13:
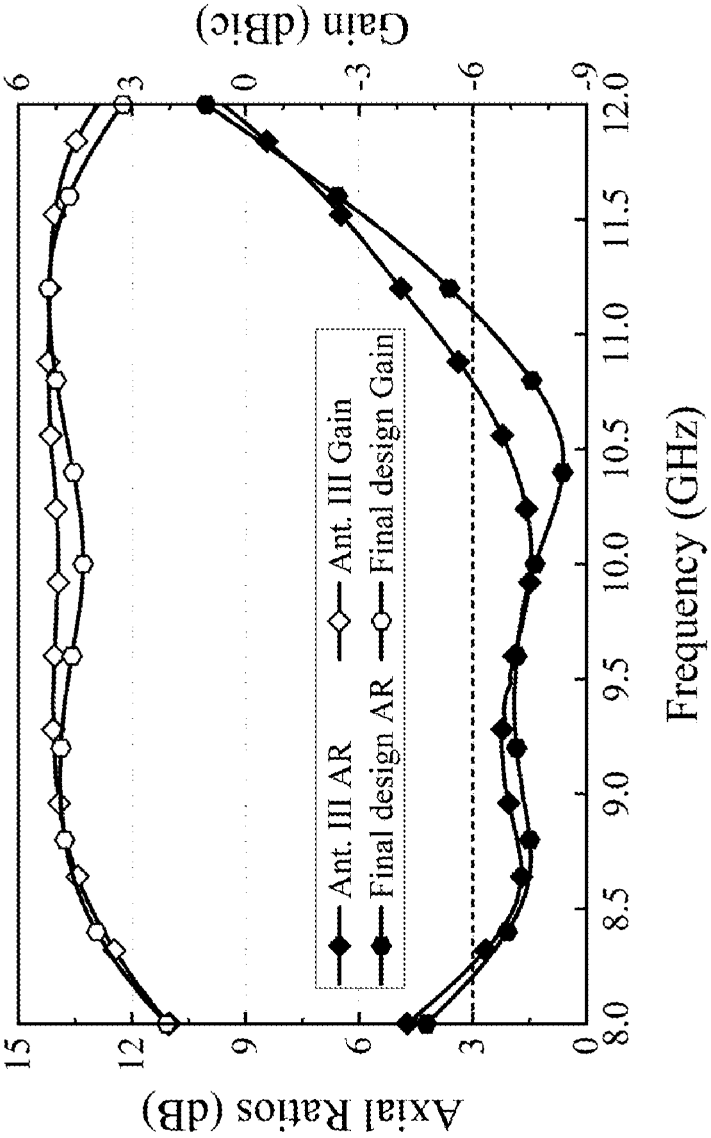
FIG. 13 is a graph showing axial ratios (dB) and gains (dBic) of the antenna design in the third design stage ("Ant. III") and the antenna design in the final design stage ("Final design") at different frequencies (GHz)

FIG. 13 compares the axial ratio and antenna gain of the final design and Ant. III. With reference FIG. 13, the final design has a wider axial ratio bandwidth (after the polarizer is introduced), at the cost of slightly reducing the peak antenna gain from 4.9 dB to 4.3 dB. The small reduction of the gain may be caused by the upper part (polarizer) of the final design, which has a lower effective dielectric constant. The S-parameters of the final design are compared with those of Ant. III, and it is found that the two MIMO antennas (Ant. III and Final design) have similar results (not included here for brevity).

Figure 14:
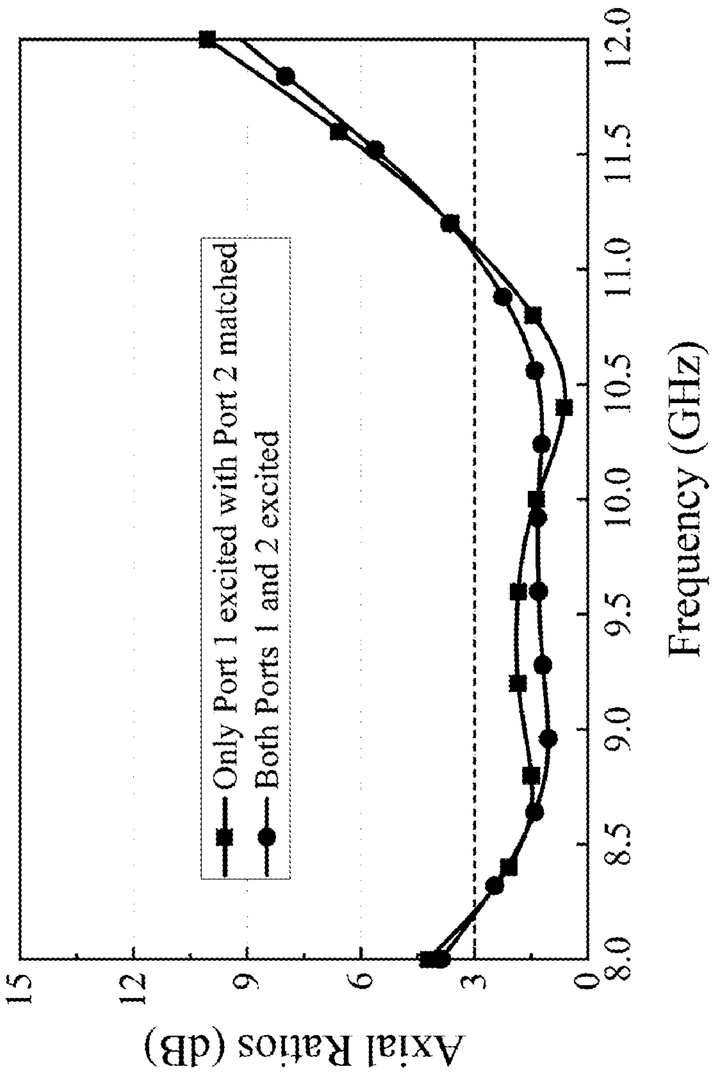
FIG. 14 is a graph showing axial ratios (dB) of the antenna design in the final design stage ("Final design") at different frequencies (GHz) for two cases: (1) one of the port is excited and one of the port is matched, (2) both parts of excited.

FIG. 14 compares the axial ratios of the final design for two cases: (1) Port 1 for one antenna element is excited with Port 2 for another antenna element matched, and (2) both Ports 1 and 2 for both antenna elements are excited. With reference to FIG. 14, the two axial ratio results are similar. This further verifies that the mutual coupling between the two ports is small.

Figure 15:
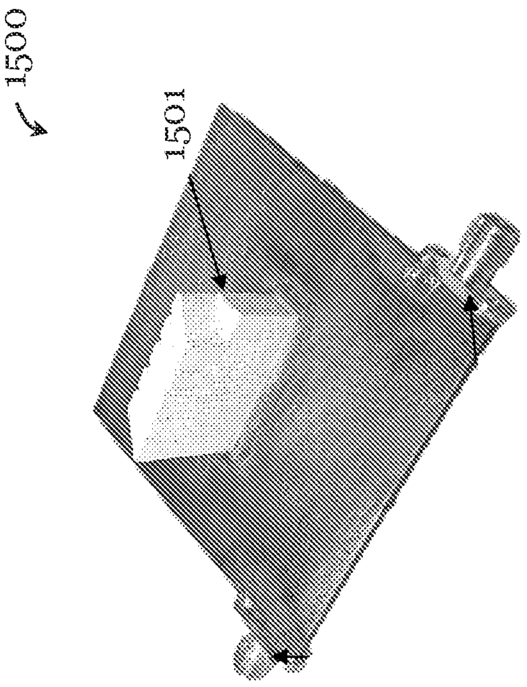
FIG. 15 is a photo of an antenna fabricated based on the antenna design in the final design stage ("Final design") in one embodiment of the invention.

A prototype of the final antenna design is fabricated. FIG. 15 shows the antenna 1500 fabricated based on the antenna design in the final design stage ("Final design") in one embodiment of the invention. The antenna 1500 includes an additively manufactured part 1501 made by two different dielectric materials ($\varepsilon_{r1}$ for the circularly polarized dielectric resonator antenna elements and $\varepsilon_{r2}$ for the polarizer-integrated decoupler), with the additively manufactured part mounted on a substrate assembly with ground plane and feeds (two ports shown). The additively manufactured part 1501 generally corresponds to the antenna elements and the dielectric arrangement (with integrated polarizer arrangement). The dielectric constants of the filaments used in additive manufacturing of the additively manufactured part 1501 are $\varepsilon_{r1}$=12±0.5 and $\varepsilon_{r2}$=5±0.15 with the loss tangents of 0.0029 and 0.0036 at 2.4 GHz, respectively.

Experiments are performed on the antenna 1500. In the experiment, the S-parameters are measured using an Agilent Vector Network Analyzer PNA-L N5230A whereas the axial ratio, radiation pattern, realized gain, and efficiency are measured with a Satimo StarLab system.

Figure 16:
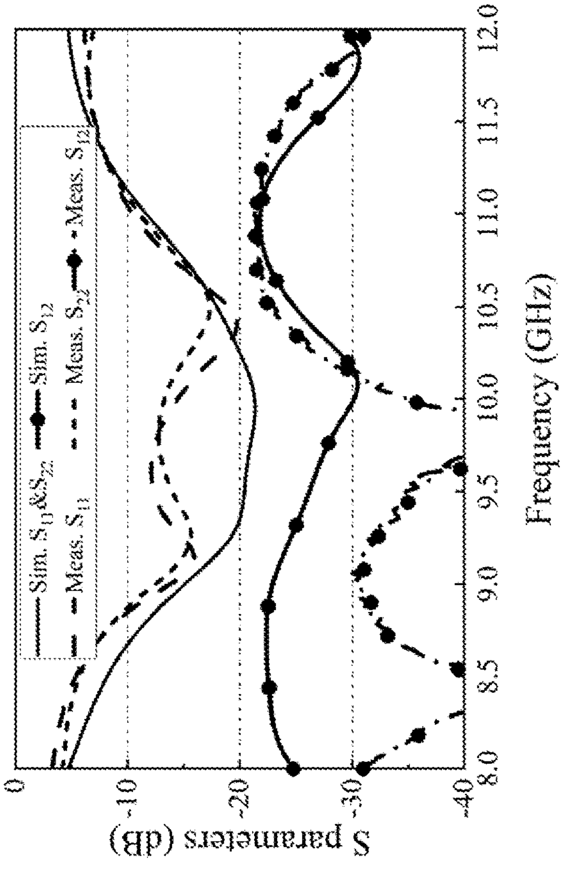
FIG. 16 is a graph showing measured and simulated S-parameters $S_{11}$, $S_{12}$, $S_{22}$ (dB) of the antenna of FIG. 15 at different frequencies (GHz)

FIG. 16 shows the measured and simulated S-parameters of the antenna 1500, with reasonable agreement between them. The discrepancy between the measured and simulated results is due to experimental imperfections including the tolerances of the dielectric constants of the printing filaments. The measured impedance bandwidths of the two circularly polarized dielectric resonator antenna elements are both 21.7% (8.88-11.04 GHZ). Their measured mutual couplings $|S_{12}|$ are well below −21 dB across the impedance passband.

Figure 17:
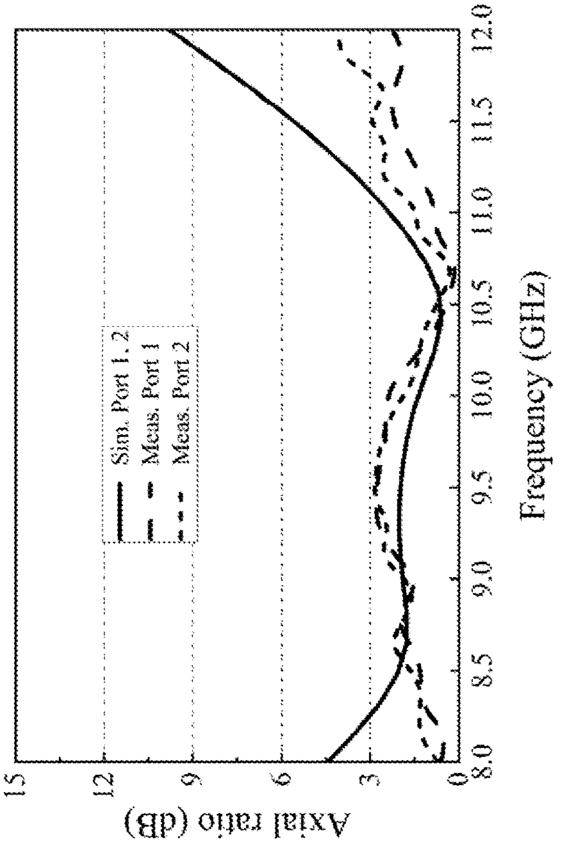
FIG. 17 is a graph showing measured and simulated axial ratios (dB) of the antenna elements 1, 2 (Ports 1, 2) of the antenna of FIG. 15 at different frequencies (GHz)

FIG. 17 shows the measured axial ratios of the two dielectric resonator antenna elements of the antenna 1500. As shown in FIG. 17, the axial ratios of the two dielectric resonator antenna elements are below 3 dB across the impedance passband.

Figure 18A:
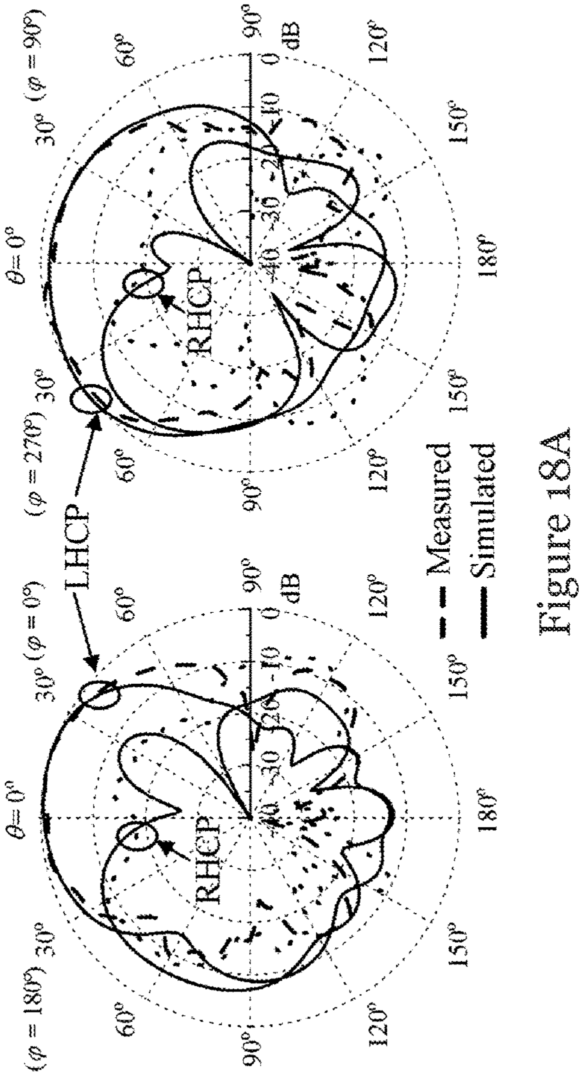
FIG. 18A is a plot showing simulated and measured radiation patterns of antenna element 1 (Port 1) of the antenna of FIG. 15 at different frequencies (GHz)
Figure 18B:
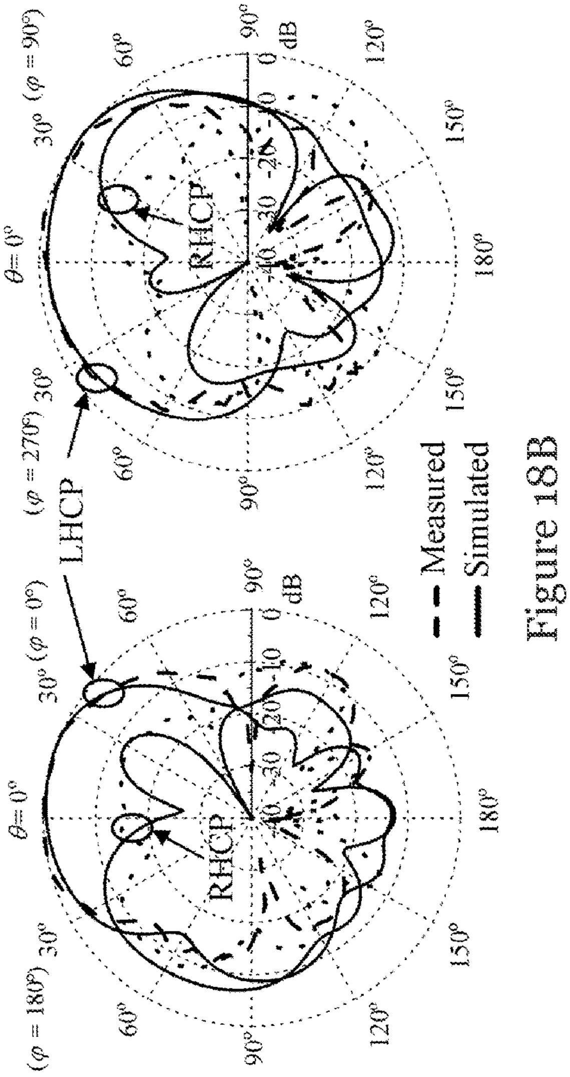
FIG. 18B is a plot showing simulated and measured radiation patterns of antenna element 2 (Port 2) of the antenna of FIG. 15 at different frequencies (GHz)

FIGS. 18A and 18B shows the measured and simulated radiation patterns of the two circularly polarized dielectric resonator antenna elements (FIG. 18A, port 1; FIG. 18B, port 2) of the antenna 1500 at 10 GHz. As shown in these Figures, the two dielectric resonator antenna elements have boresight radiation patterns for both the xz and yz planes. In the boresight direction, the measured co-polar (left-hand CP) fields are stronger than their cross-polar counterparts (right-hand circularly polarized fields) by more than 17.5 dB, which is acceptable for some practical applications.

Figure 19:
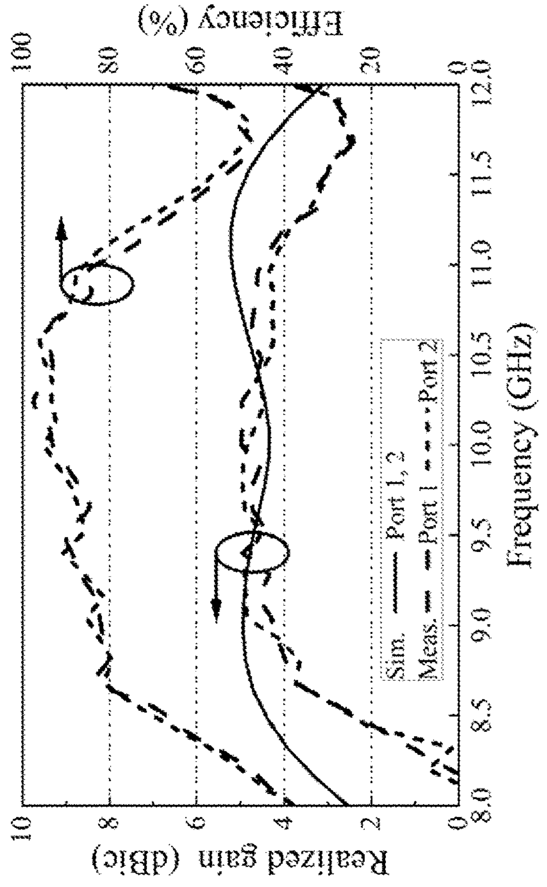
FIG. 19 is a graph showing measured and simulated realized gains (dBic) and efficiencies (%) of the antenna elements 1, 2 (Ports 1, 2) of the antenna of FIG. 15 at different frequencies (GHz)

FIG. 19 shows the measured and simulated realized gains (mismatch included) of the antenna 1500 in the boresight direction. With reference to FIG. 19, the measured result agrees reasonably well with the simulated result. The measured realized gain varies between 4 dBic and 5 dBic over the measured passband (8.88-11.04 GHZ). Also shown in FIG. 19 is the measured efficiency. It is found that the efficiency is higher than 80% across the measured passband, which is, again, acceptable for some practical applications.

Figure 20:
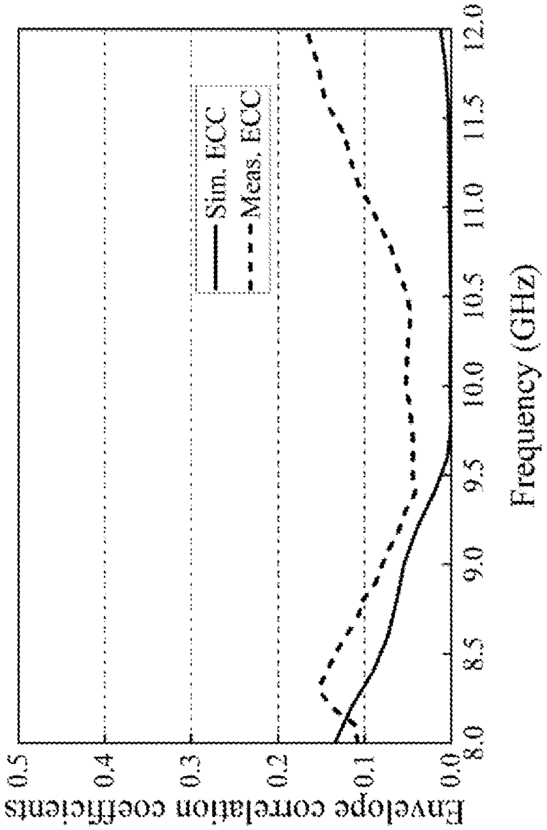
FIG. 20 is a graph showing measured and simulated envelope correlation coefficients (ECC) of the antenna of FIG. 15 at different frequencies (GHz)

FIG. 20 shows the measured and simulated envelope correlation coefficients (ECCs) of the antenna 1500 obtained from their respective 3D radiation patterns. With reference to the figure, the measured and simulated ECCs are in good agreement. The measured ECC is desirably less than 0.11 across the passband. It shows that the radiation fields of the two ports are practically uncorrelated as required in MIMO applications.

TABLE II

Features of the antenna 1500

| Technique | Pattern | C—C# ($\lambda_o$) | BW^ (%) | Footprint& ($\lambda_o^2$) | Footprint factor | Profile ($\lambda_o$) | Volume factor |
|---|---|---|---|---|---|---|---|
| Weak field distribution | Q-BS | 0.33 | 21.7 | 0.77 × 0.19 | 1 | 0.67 | 1 |

$\lambda_o$: Wavelength in air at the center frequency of operation band

#Center-to-center distance

^Overlapping region of the impedance, 20 dB-isolation and axial ratio passbands

&Size of ground plane with feeding circuit is excluded

Table II lists some key features of the antenna 1500 in this embodiment, including small footprint and wide operating bandwidth.

Some embodiments of the invention have provided a dielectric decoupler for circularly polarized multi-input-multi-output antenna system. In some embodiments, the dielectric decoupler is integrated with a polarizer to enhance the circular polarization characteristics. Some embodiments of the invention have provided a circularly polarized multi-input-multi-output antenna with relatively wide overlapping bandwidth, relatively high isolation, and relatively stable gain curve. In some embodiments, the dielectric decoupler and the dielectric resonators can be fabricated additively manufactured in one go. Some embodiments of the invention have provided solution to suppress the dielectric resonator antenna element decoupling, which is useful for dielectric resonator antenna element MIMO designs.

Some embodiments of the invention have provided one or more of the following features. In some embodiments, there is provided a compact circularly polarized MIMO antenna. In some embodiments, the antenna has two identical dielectric resonator elements separated by 0.33λ0 with high isolations more than 20 dB for multi-input-multi-output (MIMO) applications. In some embodiments, the antenna has a dielectric decoupler for circularly polarized waves. In some embodiments, the antenna is very compact and can be easily applied to miniature wireless communication systems or can be useful for compact systems such as Internet of Things (IoT) and satellite communication. In some embodiments, the antenna can be used for circular polarization MIMO communication systems to provide a relatively large ergodic channel capacity.

It will be appreciated by a person skilled in the art that variations and/or modifications may be made to the described and/or illustrated embodiments of the invention to provide other embodiments of the invention. The described/or illustrated embodiments of the invention should therefore be considered in all respects as illustrative, not restrictive. Example optional features of some embodiments of the invention are provided in the summary and the description. Some embodiments of the invention may include one or more of these optional features (some of which are not specifically illustrated in the drawings). Some embodiments of the invention may lack one or more of these optional features (some of which are not specifically illustrated in the drawings). For example, the shape, size, form, and/or construction of the antenna may be different from those specifically illustrated. For example, the antenna elements need not be or include dielectric resonator elements, and can be or include other types of radiators such as patches, dipoles and slots. For example, the separation between the radiators in the module can be different from those examples illustrated. For example, the dielectric decoupler for circularly polarized electromagnetic waves can be single-layered, two-layered, or multiple-layered. For example, the material of the dielectric decoupler can be solid (bulk or powder) or liquid. For example, the operation frequency of the antenna can be changed to other frequency or frequency band(s).

The invention claimed is:

1. An antenna comprising:

a plurality of antenna elements each respectively operable as a radiator of electromagnetic waves; the plurality of antenna elements each respectively configured to operate as a radiator of generally circularly-polarized electromagnetic waves;

a decoupler arrangement configured to prevent or reduce mutual coupling of the plurality of antenna elements when one or more of the plurality of antenna elements are operated as radiator; and a polarizer arrangement operably coupled with the plurality of antenna elements and configured to affect polarization of electromagnetic waves provided by one or more of the plurality of antenna elements when one or more of the plurality of antenna elements are operated as radiator;

wherein the polarizer arrangement is a circular polarization polarizer arrangement configured to facilitate or enhance circular polarization of electromagnetic waves provided by one or more of the plurality of antenna elements; the polarizer arrangement comprising a plurality of dielectric slabs that are spaced apart and arranged generally in parallel with a polarizer arrangement axis.

2. The antenna of claim 1, wherein the plurality of antenna elements have substantially the same construction.

3. The antenna of claim 1, wherein the plurality of antenna elements are each respectively configured to operate as a radiator of generally circularly-polarized electromagnetic waves.

4. The antenna of claim 3, wherein the plurality of antenna elements are each respectively configured to operate as a radiator of generally circularly-polarized electromagnetic waves of the same sense.

5. The antenna of claim 1, wherein the plurality of antenna elements comprise a first dielectric resonator element and a second dielectric resonator element.

6. The antenna of claim 5, wherein the first dielectric resonator element and the second dielectric resonator element each comprises a generally cuboidal or generally cubic body.

7. The antenna of claim 6, wherein the generally cuboidal or generally cubic body comprises a cuboidal or cubic portion and a corresponding chamfered cuboidal or cubic portion.

8. The antenna of claim 7, wherein the corresponding chamfered cuboidal or cubic portion comprises opposed chamfered edges each having a respective chamfer angle of about 30 degrees to about 60 degrees.

9. The antenna of claim 5, wherein in plan view a center of the first dielectric resonator element and a center of the second dielectric resonator element are separated by less than $0.4\lambda_0$ or about $0.3\lambda_0$, where $\lambda_0$ is wavelength in air at a center frequency of operation frequency band of the antenna.

10. The antenna of claim 1, wherein the decoupler arrangement comprises a dielectric member receiving or covering at least part of each of the plurality of antenna elements.

11. The antenna of claim 10, wherein the dielectric member comprises a body and one or more holes formed in the body and receiving at least part of each of the plurality of antenna elements.

12. The antenna of claim 10, wherein the plurality of antenna elements each has a first dielectric constant or effective dielectric constant; and wherein the dielectric member has a second dielectric constant or effective dielectric constant less than the first dielectric constant or effective dielectric constant.

13. The antenna of claim 1, wherein the polarizer arrangement is at least partly integrated with the decoupler arrangement such that the polarizer arrangement may be operable as part of the decoupler arrangement.

14. The antenna of claim 1, wherein the polarizer arrangement and the decoupler arrangement are integrally formed.

15. The antenna of claim 1, wherein the decoupler arrangement comprises a dielectric member receiving or covering at least part of each of the plurality of antenna elements;

wherein the dielectric member extends along a generally horizontal axis; and wherein the polarizer arrangement axis and the generally horizontal axis are arranged at an angle of about 30 degrees to about 60 degrees.

16. The antenna of claim 1, wherein the plurality of antenna elements each has a first dielectric constant or effective dielectric constant;

wherein the decoupler arrangement has a second dielectric constant or effective dielectric constant less than the first dielectric constant or effective dielectric constant; and wherein the polarizer arrangement has a third dielectric constant or effective dielectric constant less than the second dielectric constant or effective dielectric constant.

17. The antenna of claim 1, wherein the plurality of antenna elements each has a first dielectric constant or effective dielectric constant; and wherein the plurality of dielectric slabs each has a second dielectric constant or effective dielectric constant less than the first dielectric constant or effective dielectric constant.

18. The antenna of claim 1, further comprising:

a substrate with a first side and a second side opposite the first side; and a ground plane arranged on the first side of the substrate;

wherein the plurality of antenna elements, the decoupler arrangement, and the polarizer arrangement are arranged on or above the ground plane.

19. The antenna of claim 18, further comprising a plurality of feeds each configured for a respective one of the plurality of antenna elements.

20. The antenna of claim 19, wherein each of the plurality of feeds comprises a slot feed mechanism.

21. The antenna of claim 19, wherein each of the plurality of feeds respectively comprises:

a slot arranged on the ground plane and on which a respective one of the plurality of antenna elements is placed;

a feedline circuit arranged on the second side of the substrate and operably coupled with the slot; and a port operably coupled with the feedline circuit.

22. The antenna of claim 21, wherein the slot comprises a generally cross-shaped slot.

23. The antenna of claim 22, wherein the generally cross-shaped slot comprises a longer generally rectangular slot portion and a shorter generally rectangular slot portion that are arranged generally perpendicularly; and wherein the longer generally rectangular slot portion elongates along a long axis that is generally perpendicular to the polarizer arrangement axis.

24. The antenna of claim 1, wherein the antenna is configured to operate at X-band.

* * * * *